United States Patent
Kook et al.

(10) Patent No.: US 10,661,802 B2
(45) Date of Patent: May 26, 2020

(54) VEHICLE AND METHOD OF CONTROLLING THE SAME

(71) Applicants: Hyundai Motor Company, Seoul (KR); Kia Motors Corporation, Seoul (KR)

(72) Inventors: Jae Chang Kook, Hwaseong-si (KR); Kwang Hee Park, Suwon-si (KR); Byeong Wook Jeon, Seoul (KR); Sang Jun Park, Seoul (KR)

(73) Assignees: Hyundai Motor Company, Seoul (KR); Kia Motors Company, Seoul (KR)

( * ) Notice: Subject to any disclaimer, the term of this patent is extended or adjusted under 35 U.S.C. 154(b) by 79 days.

(21) Appl. No.: 16/117,675

(22) Filed: Aug. 30, 2018

(65) Prior Publication Data

US 2019/0351909 A1 Nov. 21, 2019

(30) Foreign Application Priority Data

May 16, 2018 (KR) .......................... 10-2018-0055730

(51) Int. Cl.
*B60W 30/18* (2012.01)
*B60W 10/06* (2006.01)
*B60W 10/10* (2012.01)

(52) U.S. Cl.
CPC ...... *B60W 30/18163* (2013.01); *B60W 10/06* (2013.01); *B60W 10/10* (2013.01);
(Continued)

(58) Field of Classification Search
CPC ...... B60W 10/06; B60W 10/10; B60W 30/18; B60W 30/18072; B60W 30/18163;
(Continued)

(56) References Cited

U.S. PATENT DOCUMENTS

| 2010/0082215 A1* | 4/2010 | Miyajima | ............. B60W 10/08 701/93 |
| 2011/0178689 A1* | 7/2011 | Yasui | ........................ B60T 7/12 701/70 |

(Continued)

FOREIGN PATENT DOCUMENTS

| JP | 2016-182934 A | 10/2016 |
| JP | 2017-020460 A | 1/2017 |

(Continued)

*Primary Examiner* — Edwin A Young
(74) *Attorney, Agent, or Firm* — Morgan, Lewis & Bockius LLP

(57) ABSTRACT

A vehicle may include an engine; a transmission; an accelerator pedal position sensor; a steering wheel; a steering angle sensor; and a processor configured to control the engine according to a position of an accelerator pedal detected by the accelerator pedal position sensor and to shift the transmission to a neutral state when a position of the accelerator pedal coincides with a reference position while the transmission is in a driving state, wherein the processor shifts the transmission to a driving state when a steering angle of the steering wheel detected by the steering angle sensor is equal to or greater than a reference angle while the transmission is in a neutral state.

20 Claims, 21 Drawing Sheets

(52) U.S. Cl.
CPC ..... *B60W 2420/42* (2013.01); *B60W 2420/52* (2013.01); *B60W 2510/101* (2013.01); *B60W 2540/10* (2013.01); *B60W 2540/18* (2013.01); *B60W 2540/20* (2013.01); *B60W 2554/00* (2020.02); *B60W 2554/801* (2020.02); *B60W 2554/804* (2020.02); *B60W 2710/1005* (2013.01)

(58) Field of Classification Search
CPC .......... B60W 2030/18081; B60W 2030/1809; B60W 2420/42; B60W 2420/52; B60W 2510/101; B60W 2540/10; B60W 2540/18; B60W 2540/20; B60W 2710/1005
See application file for complete search history.

(56) References Cited

U.S. PATENT DOCUMENTS

2014/0005869 A1* 1/2014 Kubotani ................ B60L 15/20
701/22
2015/0088349 A1 3/2015 Akashi et al.

FOREIGN PATENT DOCUMENTS

| JP | 2017-032019 A | 2/2017 |
| KR | 10-2015-0010982 A | 1/2015 |
| KR | 10-2016-0071011 A | 6/2016 |

* cited by examiner

VEHICLE AND METHOD OF CONTROLLING THE SAME

CROSS-REFERENCE TO RELATED APPLICATION

The present application claims priority to Korean Patent Application No. 10-2018-0055730, filed on May 16, 2018, the entire contents of which is incorporated herein for all purposes by this reference.

BACKGROUND OF THE INVENTION

Field of the Invention

The present invention relates to a vehicle and a method of controlling the same, and more particularly, to a vehicle configured for improving an acceleration response of the vehicle, and a method of controlling the same.

Description of Related Art

Generally, a vehicle refers to a machine for movement or transportation, designed to travel on a road or railway using an engine and/or a motor that generates power from fossil fuel and/or electric power as a power source. For example, the vehicle may include wheels, an engine for generating power, a transmission for transmitting power to the wheels, and the like.

The transmission may include a clutch and a gear to efficiently transmit the power of the engine to the wheels. The gears have a gear ratio changed in a response to the speed of the vehicle and/or the driver's manipulation such that the power of the engine is efficiently transmitted to the wheels. The clutch allows the engine to be engaged with the wheels such that the power of the engine is transmitted to the wheels or to be disengaged from the wheels to mitigate the impact resulting from changing the gear ration.

The vehicle may be run by inertia to improve the fuel efficiency of the engine. For example, when a driver separates his/her foot from an accelerator pedal while the vehicle is running, the vehicle performs coasting. The vehicle maintains rotation of the engine without injecting fuel into the engine (hereinafter referred to as fuel cut), improving the fuel efficiency.

However, during the fuel cut, the engine is configured as a load on the vehicle, so that the travel distance of the vehicle to be traveled by inertia may be reduced. T. This requires the driver to re-accelerate, and as the frequency of re-accelerations increases, the fuel efficiency of the vehicle may be lowered.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for shifting a transmission to a neutral position during coasting and a method of controlling the same.

It is another object of the present invention to a vehicle configured for shifting a transmission to a driving position in a response to detecting an acceleration intention of a driver during coasting, and a method of controlling the same.

It is another object of the present invention to a vehicle configured for shifting a transmission to a driving position in a response to detecting a lane change intention of a driver during coasting, and a method of controlling the same.

Additional aspects of the present invention will be set forth in part in the description which follows and, in part, will be obvious from the description, or may be learned by practice of the present invention.

Various aspects of the present invention are directed to providing a vehicle including: an engine; a transmission; an accelerator pedal position sensor; a steering wheel; a steering angle sensor; and a processor configured to control the engine according to a position of an accelerator pedal detected by the accelerator pedal position sensor, and shift the transmission to a neutral state when the position of the accelerator pedal coincides with a reference position while the transmission is in a driving state, wherein the processor shifts the transmission to the driving state when a steering angle of the steering wheel detected by the steering angle sensor is equal to or greater than a reference angle while the transmission is in the neutral state.

The vehicle may further include a multi-function switch, wherein the processor may shift the transmission to the driving state when the multi-function switch is disposed in a direction-indicating position while the transmission is in the neutral state.

The vehicle may further include an image sensor configured to capture an image of a front side of the vehicle, wherein the processor may shift the transmission to the driving state when a steering angle of the steering wheel is equal to or greater than the reference angle and a lane departure of the vehicle is detected on the basis of the image captured by the image sensor while the transmission is in the neutral state.

The vehicle may further include an image sensor configured to capture an image of a front side of the vehicle, wherein the processor may maintain the transmission in the neutral state when a violation of centerline of the vehicle is detected on the basis of the image captured by the image sensor while the transmission is in the neutral state.

The vehicle may further include a rear side radar sensor configured to emit radio waves rearwards of the vehicle, wherein the processor may maintain the transmission in the neutral state when an obstacle positioned at a rear side of the vehicle is detected on the basis of reflective radio waves received by the rear side radar sensor while the transmission is in the neutral state.

The vehicle may further include a front side radar sensor configured to emit radio waves forwards of the vehicle, wherein the processor may shift the transmission to the driving state when another vehicle positioned in a range of a first reference distance of the vehicle is detected on the basis of reflective radio waves received by the front side radar sensor with the transmission being in the neutral state.

The processor may shift the transmission to the driving state when another vehicle positioned outside a range of a second reference distance of the vehicle, which is greater than the first reference distance, is detected on the basis of reflective radio waves received by the front side radar sensor with the transmission being in the neutral state.

The processor may shift the transmission to the driving state when another vehicle is detected to have a relative speed less than a first reference speed on the basis of reflective radio waves received by the front side radar sensor while the transmission is in the neutral state.

The processor may shift the transmission to the driving state when another vehicle is detected to have a relative speed greater than a second reference speed, which is greater than the first reference speed, on the basis of reflective radio waves received by the front side radar sensor while the transmission is in the neutral state.

Various aspects of the present invention are directed to providing a method of controlling a vehicle including an engine, a transmission, and a steering wheel, the method including: controlling the engine according to a position of an accelerator pedal; shifting the transmission to a neutral state when the position of the accelerator pedal coincides with a reference position while the transmission is in a driving state; and shifting the transmission to the driving state when a steering angle of the steering wheel is equal to or greater than a reference angle while the transmission is in the neutral state.

The method may further include shifting the transmission to the driving state when a multi-function switch is disposed in a direction-indicating position while the transmission is in the neutral state.

The method may further include shifting the transmission to the driving state when a lane departure of the vehicle is detected on the basis of a front view image captured by an image sensor while the transmission is in the neutral state.

The method may further include maintaining the transmission in the neutral state when a violation of centerline of the vehicle is detected on the basis of a front view image captured by an image sensor while the transmission is in the neutral state.

The method may further include maintaining the transmission in the neutral state when an obstacle positioned at a rear side of the vehicle is detected on the basis of reflective radio waves received by a rear side radar sensor while the transmission is in the neutral state.

The method may further include shifting the transmission to the driving state when another vehicle positioned in a range of a first reference distance of the vehicle is detected on the basis of reflective radio waves received by a front side radar sensor while the transmission is in the neutral state.

The method may further include shifting the transmission to the driving state when another vehicle positioned outside a range of a second reference distance of the vehicle, which is greater than the first reference distance, is detected on the basis of reflective radio waves received by the front side radar sensor while the transmission is in the neutral state.

The method may further include shifting the transmission to the driving state when another vehicle is detected to have a relative speed less than a first reference speed on the basis of reflective radio waves received by the front side radar sensor while the transmission is in the neutral state.

The method may further include shifting the transmission to the driving state when another vehicle is detected to have a relative speed greater than a second reference speed, which is greater than the first reference speed, on the basis of reflective radio waves received by the front side radar sensor while the transmission is in the neutral state.

Various aspects of the present invention are directed to providing a vehicle including: an engine; a transmission; an accelerator pedal position sensor; a multi-function switch; a direction indicating lamp; and a processor configured to control the engine according to a position of an accelerator pedal detected by the accelerator pedal position sensor, and shift the transmission to a neutral state when the position of the accelerator pedal coincides with a reference position while the transmission is in a driving state, wherein the processor turns on the direction indicating lamp when the multi-function switch is disposed in a direction indicating position, and shifts the transmission to the driving state when the multi-function switch is disposed in the direction-indicating position while the transmission is in the neutral state.

The vehicle may further include a steering wheel and a steering angle sensor, and the processor may shift the transmission to the driving state when a steering angle of the steering wheel detected by the steering angle sensor is equal to or greater than a reference angle while the transmission is in the neutral state.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
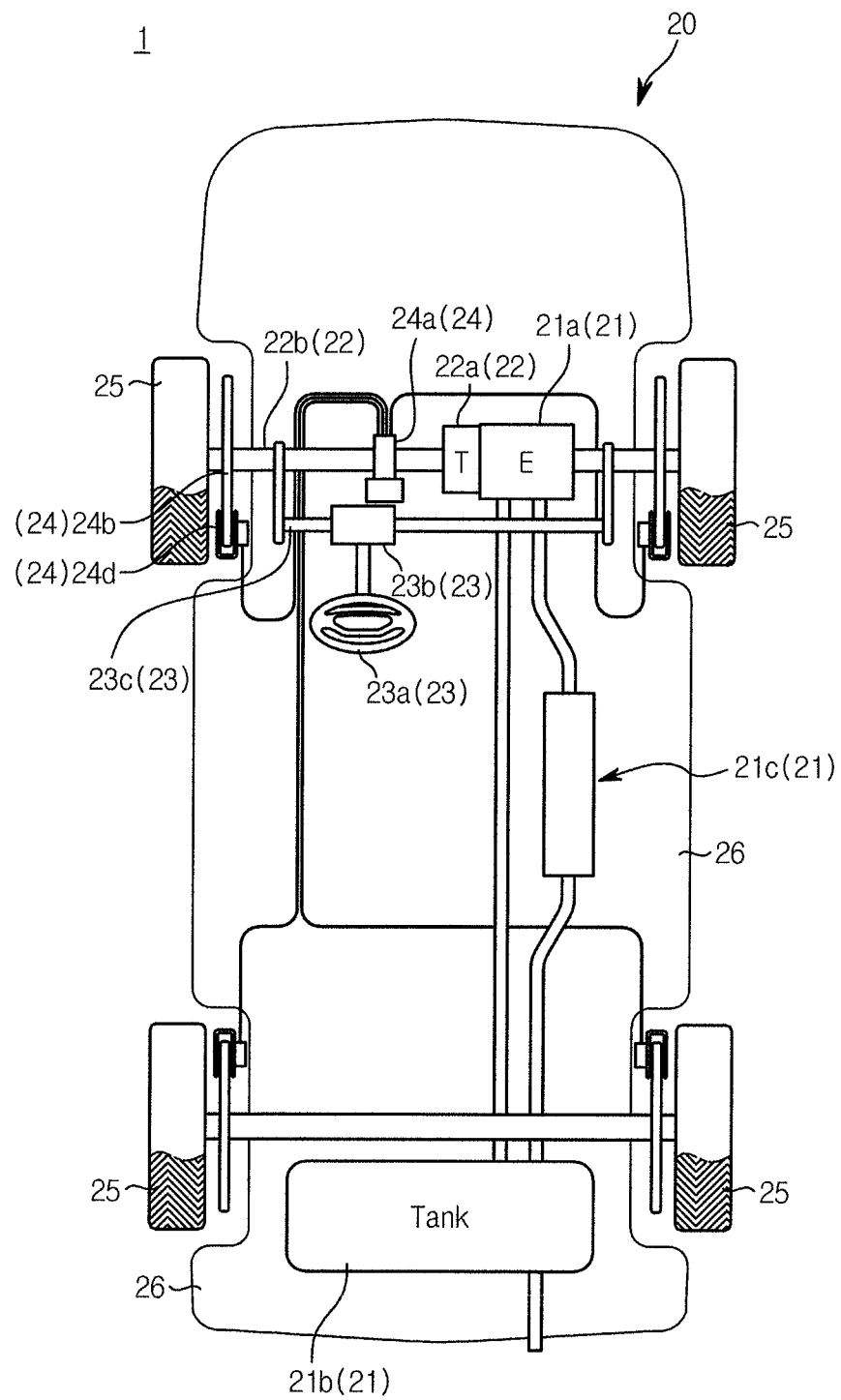
FIG. 1 illustrates mechanical parts of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
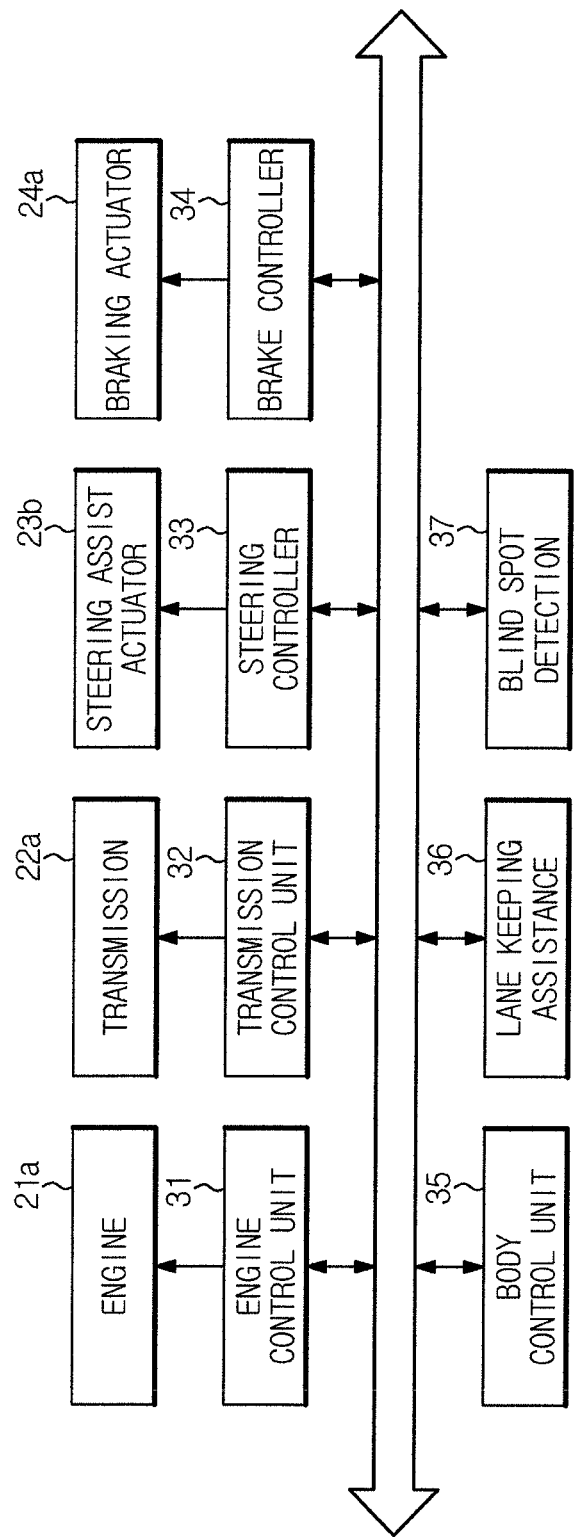
FIG. 2 illustrates electronic parts of a vehicle according to an exemplary embodiment of the present invention.

FIG. 1 illustrates mechanical parts of a vehicle according to an exemplary embodiment of the present invention. FIG. 2 illustrates electronic parts of a vehicle according to an exemplary embodiment of the present invention.

A vehicle 1 may include a body 20 forming the external appearance of the vehicle 1 and accommodating a driver/baggage and a chassis 20 including parts of the vehicle 1 except for the body, and electronic parts 30 configured to protect the driver or provide comfort to the driver.

The chassis 20 may include devices that generate power to drive the vehicle 1 under the control of the driver and drive/steer/brake the vehicle 1 using the power.

For example, referring to FIG. 1, the chassis 20 may include a power generating device 21, a power transmitting device 22, a steering device 23, a braking device 24, wheels 25, a frame 26, and the like.

The power generating device 21 may generate power for driving the vehicle 1, and include an engine 21a, an accelerator pedal, a fuel supply device 21b, an exhaust device 21c, and the like.

The power transmitting device 22 may transmit the power generated by the power generating device 21 to the wheels 25, and include a shift lever, a transmission 22a, a driveshaft 22b, and the like.

The steering device 23 may control the driving direction of the vehicle 1 and include a steering wheel 23a, a steering assist actuator 23b, a steering link 23c, and the like.

The braking device 24 may stop the vehicle 1 and include a braking pedal, a braking actuator 24a, a brake disc 24b, a brake pad 24c, and the like.

The wheel 25 may receive rotational force from the power generating device 21 through the power transmitting device 22, and may move the vehicle 1. The wheel 25 may include front wheels provided at the front of the vehicle 1 and rear wheels provided at the rear of the vehicle 1.

The frame 26 may support the power generating device 21, the power transmitting device 22, the steering device 23, the braking device 24, and the wheels 25.

The vehicle 1 may include various electronic parts 30 configured to control the vehicle 1 and provide the safety and convenience of a driver and a fellow passenger, in addition to the mechanical parts described above.

For example, referring FIG. 2, the vehicle 1 includes an engine control unit (ECU) 31, a transmission control unit (TCU) 32, a steering controller 33, a brake controller 34, a body control module (BCM) 35, a lane keeping assistance (LKA) 36, a blind spot detection (BSD) 37, and the like.

The engine control unit 31 may control the operation of the engine 21a in a response to an acceleration intention of a driver through the accelerator pedal. The engine control unit 31 may perform torque control, fuel efficiency control, failure diagnosis, and the like of the engine 21a.

The transmission control unit 32 may control the operation of the transmission 22a in a response to a shift command of a driver through a shift lever or a driving speed of the vehicle 1. The transmission control unit 32 may perform clutch control, shift control, and/or engine torque control during shift.

The steering controller 33 may control the steering assist actuator 23b in a response to a steering intention of a driver through the steering wheel 23a. The steering assist actuator 23b may assist the driver in easily manipulating the steering wheel. The steering controller 33 may control the steering assist actuator 23b to reduce the steering force during low-speed driving or parking and to increase the steering force during high-speed driving.

The braking controller 34 may control the braking actuator 24a in a response to a braking intention of a driver through the braking pedal. The braking actuator 24a may boost the braking force generated by the braking pedal.

Furthermore, the braking controller 34 may control the braking actuator 24a to maintain the balance of the vehicle 1. For example, the braking controller 34 may control the braking actuator 24a for automatic parking brake control, slip prevention during braking, and/or slip prevention while driving, and the like.

The body control module 35 may control the operations of electronic parts that provide comfort to the driver or ensure the safety of the driver. For example, the body control module 35 may control a door lock device, a head lamp, a wiper, a power seat, a seat heater, a cluster, an interior lamp, a multi-function switch, and a direction indicating lamp.

The lane-keeping assistant device 36 may detect a lane departure of the vehicle 1. The lane-keeping assistant device 36 may alert the driver to a lane departure in a response to a lane departure of the vehicle 1 using a lane departure warning system (LDWS), or assist lane keeping using a lane keeping assistance system (LKAS).

The BSD 37 may detect an obstacle (another vehicle) behind the vehicle 1. The lane-keeping assistant device 36 may, in a response to detection of an obstacle behind the vehicle (another vehicle), alert the driver to a detection of the obstacle behind the vehicle (the other vehicle).

The electronic parts 30 described above may communicate with each other through a vehicle communication network (network technology). For example, the electronic parts 30 may exchange data between each other through Ethernet, Media Oriented Systems Transport (MOST), Flexray, Controller Area Network (CAN), Local Interconnect Network (LIN), and the like.

Figure 3:
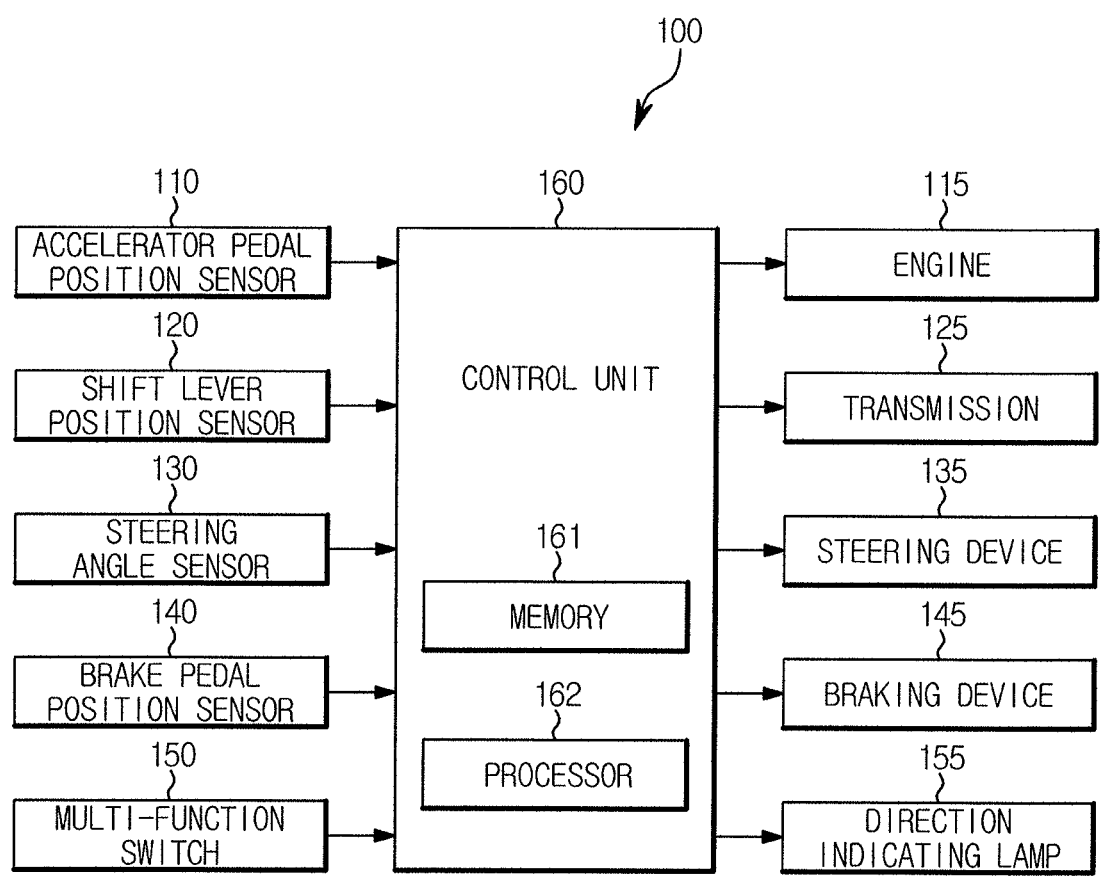
FIG. 3 illustrates an example of a configuration of a vehicle according to an exemplary embodiment of the present invention.

FIG. 3 illustrates an example of a configuration of a vehicle according to an exemplary embodiment of the present invention. Referring to FIG. 3, the vehicle 100 further includes an accelerator pedal position sensor 110, a shift lever position sensor 120, a steering angle sensor 130, a brake pedal position sensor 140, a multi-function switch 150, in addition to the engine 115, the transmission 125, the steering device 135, the braking device 145, the direction indicating lamp 155, and the control unit 160.

The accelerator pedal position sensor 110, the shift lever position sensor 120, the steering angle sensor 130, the brake pedal position sensor 140, and the multi-function switch 150 transmit signals to the control unit 160, and may be connected to the control unit 160 through a wire harness, or a vehicle communication network (NT).

Furthermore, the engine 115, the transmission 125, the steering device 135, the braking device 145, and the direction indicating lamp 155 may receive signals from the control unit 160, and may be connected to the control unit 160 through a wire harness or a vehicle communication network (NT).

The accelerator pedal position sensor 110 may detect the position and/or displacement of the accelerator pedal of the vehicle 100 and may output an electrical signal corresponding to the position and/or displacement of the accelerator pedal to the control unit 160. Since a driver operates the accelerator pedal to accelerate the vehicle 100, the output of the accelerator pedal position sensor 110 may indicate an acceleration intention of the driver (an acceleration command).

The shift lever position sensor 120 may detect the position of the shift lever of the vehicle 100 and may output an electrical signal corresponding to the position of the shift lever to the control unit 160. For example, when the vehicle 100 includes an automatic transmission, the shift lever position sensor 120 may detect one of a parking position (P), a reverse position (R), a neutral position (N), and a driving position (D) of the shift lever.

The steering angle sensor 130 may detect a rotation angle and/or a torque of the steering wheel of the vehicle 100, and may transmit an electrical signal corresponding to the rotation angle and/or the torque of the steering wheel to the control unit 160. Since a driver operates the steering wheel to change the driving direction of the vehicle 100, the output of the steering angle sensor 130 may indicate a steering intention of a driver (a steering command).

The brake pedal position sensor 140 may detect the position and/or displacement of the braking pedal of the vehicle 100 and may output an electrical signal corresponding to the position and/or displacement of the braking pedal to the control unit 160. Since a driver operates the braking pedal to brake the vehicle 100, the output of the brake pedal position sensor 140 may indicate a braking intention of the driver (a braking command).

The multi-function switch 150 may receive an input related to flicking of a head lamp, an input related to a wiper operation, and an input related to flicking of the direction indicating lamp 155 from a driver, and output a signal corresponding to the input to the control unit 160. For example, the multi-function switch 150 may receive a turn-on command of a leftward indicating lamp or a turn-on command of a rightward indicating lamp, and may output the received turn-on commands to the control unit 160.

The engine 115 may burn fossil fuel in an internal cylinder or combustion chamber and obtain power during combustion of the fossil fuel. The engine 115 may output different levels of powers depending on the fuel amount to be supplied. For example, when a larger fuel amount is supplied, the engine 115 may output a greater rotational force. The fuel amount supplied to the engine 115 may be adjusted by the control unit 160.

The transmission 125 may convert the power generated by the engine 115 into a rotational force required according to the operation of the driver or the speed of the vehicle 100. In detail, the transmission 125 may change the speed of rotation of the engine 115 by use of internal gears, and transmit to the wheels 25 the rotation with the changed speed. The transmission 125 may adjust a gear ratio between the gears according the operation of the driver (a manual transmission) or adjust the gear ratio between the gears according to the speed of the vehicle 100 (an automatic transmission).

In the case of an automatic transmission, the transmission 125 may have one of a parking state (P), a reverse state (R), a neutral state (N), and a driving state (D). In the parking state, the transmission 125 mechanically locks the gears connected to the wheels 25 and prevents the vehicle 100 from moving. In the reverse state, the transmission 125 reverses the rotation of the engine 115 and transmit the reversed rotation to the wheels 25, allowing the vehicle 100 to travel backwards. In the neutral state, the transmission 125 may disengage the engine 115 from the transmission 125 using a clutch such that the rotation of the engine 115 is not transmitted to the wheels 25. In the driving state, the transmission 125 may change the speed of the rotation of the engine 115 according to the driving speed of the vehicle 100, and transmit the rotation with the changed speed to the wheels 25.

The steering device 135 may assist the driver in easily operating the steering wheel. The steering device 135 may increase or decrease rotational power transmitted to the steering wheel according to the speed of the vehicle 100 and/or the steering wheel manipulation of the driver. For example, the steering device 135 may decrease the steering force during low-speed driving or parking and may increase the steering force during high-speed driving.

The braking device 145 may stop the rotation of the wheels 25 according to the rotation speed of the wheel 25 and/or the manipulation of the driver. For example, the braking device 145 may include a hydraulic circuit for braking the wheels 25. The braking device 145 may increase or decrease the hydraulic pressure of the hydraulic circuit according to the rotation speed of the wheel 25 and/or the manipulation of the driver.

Furthermore, the braking device 145 may prevent a slippage of the wheels 25 during braking, prevent a slippage of the wheels 25 during running, and stabilize the posture of the vehicle 100.

The direction indicating lamp 155 is disposed at a left end portion and a right end portion of the vehicle 100, and may indicate a steering intention of the driver to a driver of another vehicle.

The control unit 160 may control the engine 115, the transmission 125, the steering device 135, the braking device 145, the direction indicating lamp 155, and the like on the basis of output signals of the accelerator pedal position sensor 110, the shift lever position sensor 120, the steering angle sensor 130, the brake pedal position sensor 140, the multi-function switch 150, and the like.

The control unit 160 may include one or more of the engine control unit 31, the transmission control unit 32, the steering controller 33, the brake controller 34, and the body control module 35 described above. However, the present invention is not limited thereto.

The control unit 160 includes one or more memories 161 for storing programs and data for a short time or for a long time and one or more processors 162 for processing the data stored in the memory 161 for a short time or for a long time according to the programs stored in the memory 161 for a short time or for a long time. The control unit 160 may include hardware, such as the processor 162 and the memory 161, and software, such as programs and data stored in the memory 161 for a short time or for a long time.

The memory 161 may store programs and data for controlling actuators/loads 115, 125, 135, 145, and 155 included in the vehicle 100 according to output signals of sensors/switches 110, 120, 130, 140, and 150 of the vehicle 100. In detail, the memory 161 may store instructions that are executed by the processor 162 and data processed by the instructions.

The memory 161 may temporarily store the output signals of the sensors/switches 110, 120, 130, 140, and 150 included in the processor 162.

For example, the memory 161 may temporarily store output signal of the accelerator pedal position sensor 110 indicating an acceleration intention of a driver, an output signal of a shift lever position sensor 120 indicating a shift intention of a driver, an output signal of the steering angle sensor 130 indicating a steering intention of a driver, an output signal of the brake pedal position sensor 140 indicating a braking intention of a driver, and/or an output signal of the multi-function switch 150.

The memory 161 includes a nonvolatile memory, such as a Read Only Memory (ROM) or a flash memory, for storing data for a long time period and a volatile memory, such as a static random access memory (S-RAM), a dynamic random access memory (D-RAM), and the like.

The processor 162 may process the data stored in the memory 161 according to the program (a series of instructions) stored in the memory 161, and may generate a control signal for controlling the actuators/loads 115, 125, 135, 145, and 155 of the vehicle 100 according to a result of the processing the data.

For example, the processor 162 may process an output signal of the accelerator pedal position sensor 110 to generate a control signal for controlling the engine 115 according to a result of the processing, and may process an output signal of the shift lever position sensor 120 to generate a control signal for controlling the transmission 125 according to a result of processing. The processor 162 may process an output signal of the steering angle sensor 130 to generate a control signal for controlling the steering device 135 according to a result of the processing and may process an output signal of the brake pedal position sensor 140 to generate a control signal for controlling the braking device 24 according to a result of processing. Furthermore, the processor 162 may process an input related to turn-on of the direction indicating lamp 155 from the multi-function switch 150 to generate a control signal for controlling the direction indicating lamp 155 according to a result of processing.

The processor 162 may include an operational circuit for performing logical and arithmetic operations, a memory circuit for storing the determined data, and the like for a short time.

Accordingly, the control unit 160 may control the actuators/loads 115, 125, 135, 145, and 155 included in the vehicle 100 according to the output signals of the sensors/switches 110, 120, 130, 140, and 150 included in the vehicle 100.

For example, when a coasting intention of a driver is detected while driving of the vehicle 100, the control unit 160 may shift the transmission 125 to a neutral state and control the engine 115 to operate in an idle state. In detail, when the position of the accelerator pedal detected by the accelerator pedal position sensor 110 is a reference position (a position of the accelerator pedal when the driver does not apply the accelerator pedal), the control unit 160 rotates the engine 115 at the minimum speed and disengages the engine 115 from the transmission 125 using the clutch such that the vehicle 100 performs coasting. As a result, since the load associated with driving is reduced, the fuel efficiency may be improved.

When an acceleration intention of a driver is detected while the vehicle 100 performs coasting with the transmission 125 in a neutral state, the control unit 160 may shift the transmission 125 to a driving state and control the rotation of the engine 115 according to the driver's acceleration intention. In detail, when the position of the accelerator pedal detected by the accelerator pedal position sensor 110 is deviated from the reference position, the control unit 160 engages the engine 115 with the transmission 125 using the clutch, and adjust the fuel supplied to the engine 115 according to the position of the accelerator pedal detected by the accelerator pedal position sensor 110. As a result, the vehicle 100 may rapidly respond to an acceleration command of the driver.

Furthermore, when a steering intention of a driver is detected while the vehicle 100 performs coasting with the transmission 125 in a neutral state, the control unit 160 may shift the transmission 125 to a driving state and control the rotation of the engine 115 according to the driver's acceleration intention. In detail, when rotation of the steering wheel is detected by the steering angle sensor 130 or the multi-function switch 150 is disposed in a turn-on position of a direction indicating lamp, the control unit 160 may engage the engine 115 with the transmission 125 using the clutch, and adjust the fuel supplied to the engine 115 according to the position of the accelerator pedal detected by the accelerator pedal position sensor 110. As a result, the vehicle 100 may rapidly respond to an acceleration command of the driver.

As described above, to improve the fuel efficiency, the vehicle 100 may perform coasting, and to improve acceleration response, the vehicle 100 may terminate the coasting in a response to an acceleration intention and/or steering intention of a driver, and accelerate the vehicle according to a command of the driver.

Hereinafter, the operation of the vehicle 100 will be described in more detail.

Figure 4:
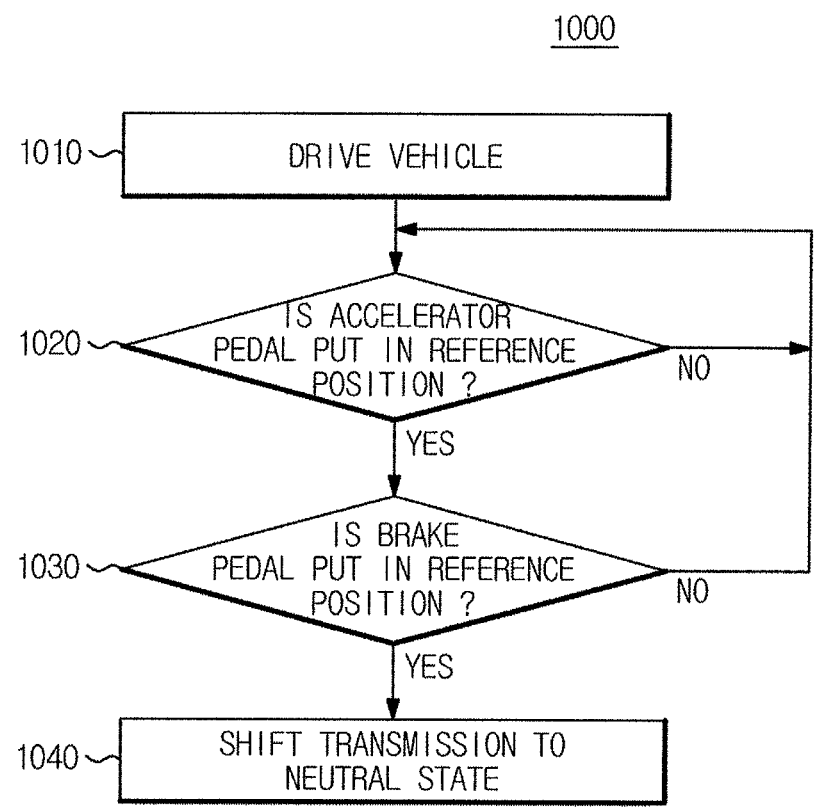
FIG. 4 illustrates a method of starting coasting of a vehicle according to an exemplary embodiment of the present invention.

FIG. 4 illustrates a method of starting coasting of a vehicle according to an exemplary embodiment of the present invention.

Referring to FIG. 4, a method 1000 of starting coasting of a vehicle is described.

The vehicle 100 is driven (1010).

When the shift lever is disposed in a driving position (D) and the accelerator pedal is deviated from the reference position (the position of the accelerator pedal when the driver does not apply the accelerator pedal), the vehicle 100 is driven.

For example, the control unit 160 may perform cracking on the engine 115 using a starter motor and supply the engine 115 with fuel. The rotation of the engine 115 may be transmitted to the wheels 25 through the transmission 125, and the vehicle 100 may be driven forward thereof.

The vehicle 100 while on the driving may determine whether the accelerator pedal is disposed in the reference position (1020). Here, the reference position of the accelerator pedal indicates the position of the accelerator pedal when the driver does not apply the accelerator pedal.

The vehicle 100 while on the driving may determine whether the driver has an acceleration intention, and may control the engine 115 according to the driver's acceleration intention. In detail, while driving of the vehicle 100, the control device 160 may periodically detect the position of the accelerator pedal using the accelerator pedal position sensor 110, and control the engine 115 according to the position of the accelerator pedal.

The control unit 160 may control the accelerator pedal position sensor 110 to detect the position of the accelerator pedal and determine whether the position of the accelerator pedal detected by the accelerator pedal position sensor 110 coincides with the reference position of the accelerator pedal. Alternatively, the control unit 160 may determine whether the distance moved by the accelerator pedal detected by the accelerator pedal position sensor 110 from the reference position is equal to "0".

When the accelerator pedal is not put in the reference position (NO in operation 1020), the vehicle 100 continues driving while performing acceleration according to the position of the accelerator pedal.

The vehicle 100 may determine whether the driver has an acceleration intention on the basis of the position of the accelerator pedal, and when the position of the accelerator pedal is different from the reference position, it is determined that the driver has an acceleration intention. Accordingly, the control unit 160 may control the engine 115 according to the position of the accelerator pedal detected by the accelerator pedal position sensor 110.

When the accelerator pedal is disposed in the reference position (YES in operation 1020), the vehicle 100 determines whether the brake pedal is disposed in a reference position of the brake pedal (1030). Here, the reference position of the brake pedal indicates the position of the brake pedal when the driver does not apply the brake pedal.

When the accelerator pedal is disposed in the reference position, it is determined that the driver has no acceleration intention.

In the present manner, the vehicle 100 may determine whether the driver has a braking intention, and control the braking device 145 according to the braking intention. In detail, while driving of the vehicle 100, the control unit 160 may periodically detect the position of the brake pedal using the brake pedal position sensor 140 and control the braking device 145 according to the position of the brake pedal.

The control unit 160 may control the brake pedal position sensor 140 to detect the position of the brake pedal and determine whether the position of the brake pedal detected by the brake pedal position sensor 140 coincides with the reference position of the brake pedal. Alternatively, the control unit 160 may determine whether the distance moved by the accelerator pedal from the reference position detected by the accelerator pedal position sensor 140 is equal to "0".

When the brake pedal is not put in the reference position (NO in operation 1030), the vehicle 100 continues driving while performing deceleration according to the position of the brake pedal.

When the position of the brake pedal is different from the reference position, it is determined that the driver has a braking intention. Accordingly, the control unit 160 may control the braking device 145 according to the position of the braking pedal detected by the brake pedal position sensor 140.

When the brake pedal is disposed in the reference position (YES in operation 1030), the vehicle 100 shifts the transmission 125 to a neutral state (1040).

When the braking pedal is disposed in the reference position, it is determined that the driver does not have a braking intention. It is determined that the driver does not desire to accelerate or brake the vehicle, and merely desires to maintain the current driving speed. In other words, it is determined that the driver desires to drive the vehicle 100 by inertia.

For the present reason, the control unit 160 may perform coasting. Furthermore, the control unit 160 may shift the transmission 125 to a neutral state to remove the load caused by the engine 115. The wheels 25 are disengaged from the engine 115 when the transmission 125 is in a neutral state, and the load with respect to rotation of the wheels 25 may be reduced to a minimum. Accordingly, reduction of the driving speed of the vehicle 100 during coasting may be minimized.

Furthermore, to rapidly respond to the driver's acceleration command, the control unit 160 may supply fuel to the engine 115 such that the engine 115 operates in an idle state. In other words, the control unit 160 may switch the engine 115 to an idle state.

As described above, when an acceleration intention and a braking intention of a driver are not detected while driving, the vehicle 100 may shift the transmission 125 to a neutral position for coasting. Furthermore, the vehicle 100 may shift the engine 115 into an idle state. As a result, the fuel efficiency of the vehicle 100 is improved, and the response speed to the driver's acceleration command may also be improved.

Figure 5:
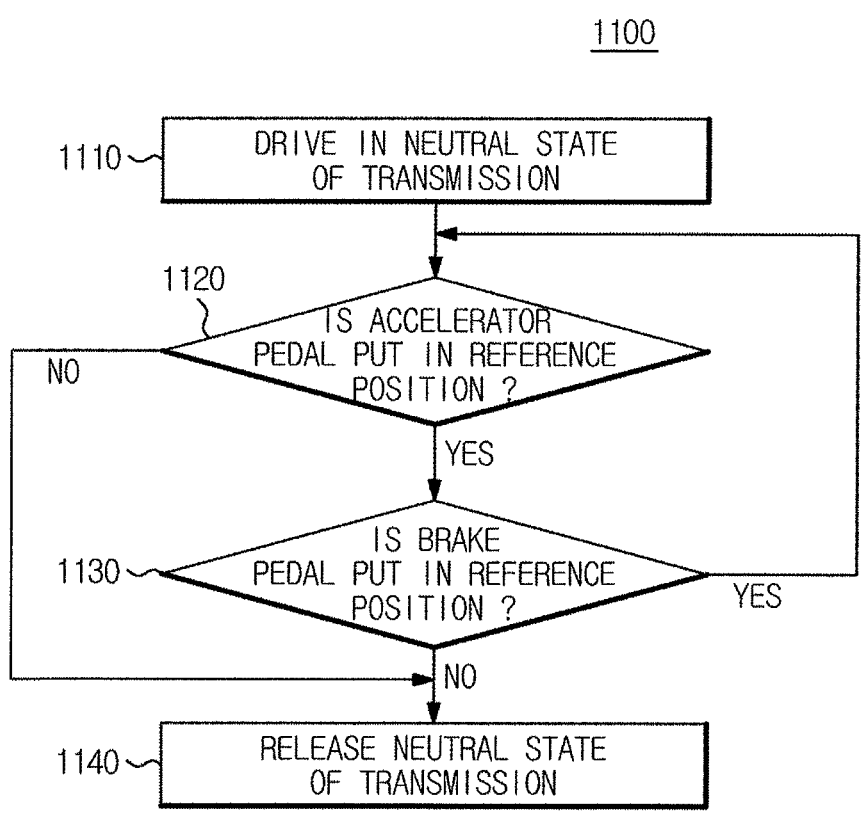
FIG. 5 illustrates an example of a method of releasing coasting of a vehicle according to an exemplary embodiment of the present invention.

FIG. 5 illustrates an example of a method of releasing coasting of a vehicle according to an exemplary embodiment of the present invention.

With reference to FIG. 5, a method 1100 of releasing coasting of the vehicle is described.

The vehicle 100 is driven in a neutral state of the transmission 125 (1110). In other words, the vehicle 100 may perform coasting.

The control unit 160 may shift the transmission 125 to a neutral state for coasting when an acceleration intention or a braking intention of a driver is not detected while driving of the vehicle 100. Furthermore, the control unit 160 may shift the engine 115 to an idle state.

The vehicle 100 determines whether the accelerator pedal is disposed in the reference position during the coasting (1120). Here, the reference position of the accelerator pedal indicates the position of the accelerator pedal when the driver does not apply the accelerator pedal.

The vehicle 100 may determine whether a driver has an acceleration intention during the coasting, and when an acceleration intention of a driver is detected, the vehicle 100 may terminate the coasting and control the engine 115 according to the acceleration intention of the driver.

The control unit 160 may control the accelerator pedal position sensor 110 to detect the position of the accelerator pedal and may determine whether the position of the accelerator pedal detected by the accelerator pedal position sensor 110 coincides with the reference position of the accelerator pedal.

When the accelerator pedal is disposed in the reference position (YES in operation 1120), the vehicle 100 determines whether the brake pedal is disposed in the reference position (1130). Here, the reference position of the brake pedal indicates the position of the brake pedal when the driver does not apply the brake pedal.

When the accelerator pedal is disposed in the reference position, it is determined that the driver does not have an acceleration intention.

Accordingly, the vehicle 100 determines whether the driver has a braking intention, and when a braking intention of the driver is detected, the vehicle 100 may terminate the coasting, and control the braking device 145 according to the braking intention.

The control unit 160 may control the brake pedal position sensor 140 to detect the position of the brake pedal and may determine whether the position of the brake pedal detected by the brake pedal position sensor 140 coincides with the reference position of the brake pedal. Alternatively, the control unit 160 may determine whether the distance moved by the accelerator pedal detected by the accelerator pedal position sensor 110 from the reference position is equal to "0".

When the braking pedal is disposed in the reference position (YES in operation 1130), the vehicle 100 continues coasting with the transmission 125 in a neutral state. Neither the acceleration intention nor the braking intention is detected, the vehicle 100 may continue coasting.

When the accelerator pedal is not put in the reference position (NO in operation 1120) or when the brake pedal is not put in the reference position (NO in operation 1130), the vehicle 100 releases the neutral state of the transmission 125 (1140).

When the position of the accelerator pedal is different from the reference position of the accelerator pedal, it is determined that the driver has an acceleration intention, and when the position of the brake pedal is different from the reference position of the brake pedal, it is determined that the driver has a braking intention.

Accordingly, in a response to the driver's acceleration intention or braking intention, the vehicle 100 may terminate the coasting. The control unit 160 may shift the transmission 125 to a driving state and control the engine 115 according to the driver's acceleration intention, or may shift the transmission 125 to a driving state and control the braking device 145 according to the driver's braking intention.

As described above, when the driver's acceleration intention or braking intention is detected during coasting of the vehicle 100, the vehicle 100 may shift the transmission 125 to a driving state to terminate the coasting of the vehicle 100.

Figure 6:
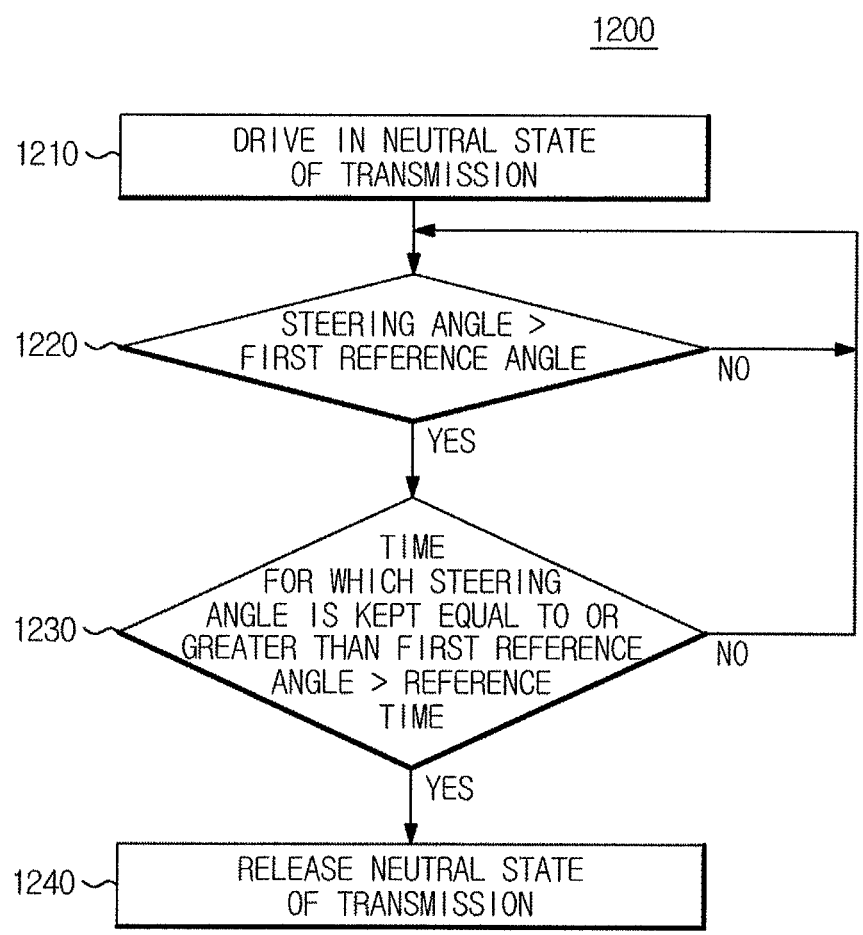
FIG. 6 illustrates another example of a method of releasing coasting of a vehicle according to an exemplary embodiment of the present invention.
Figure 7:
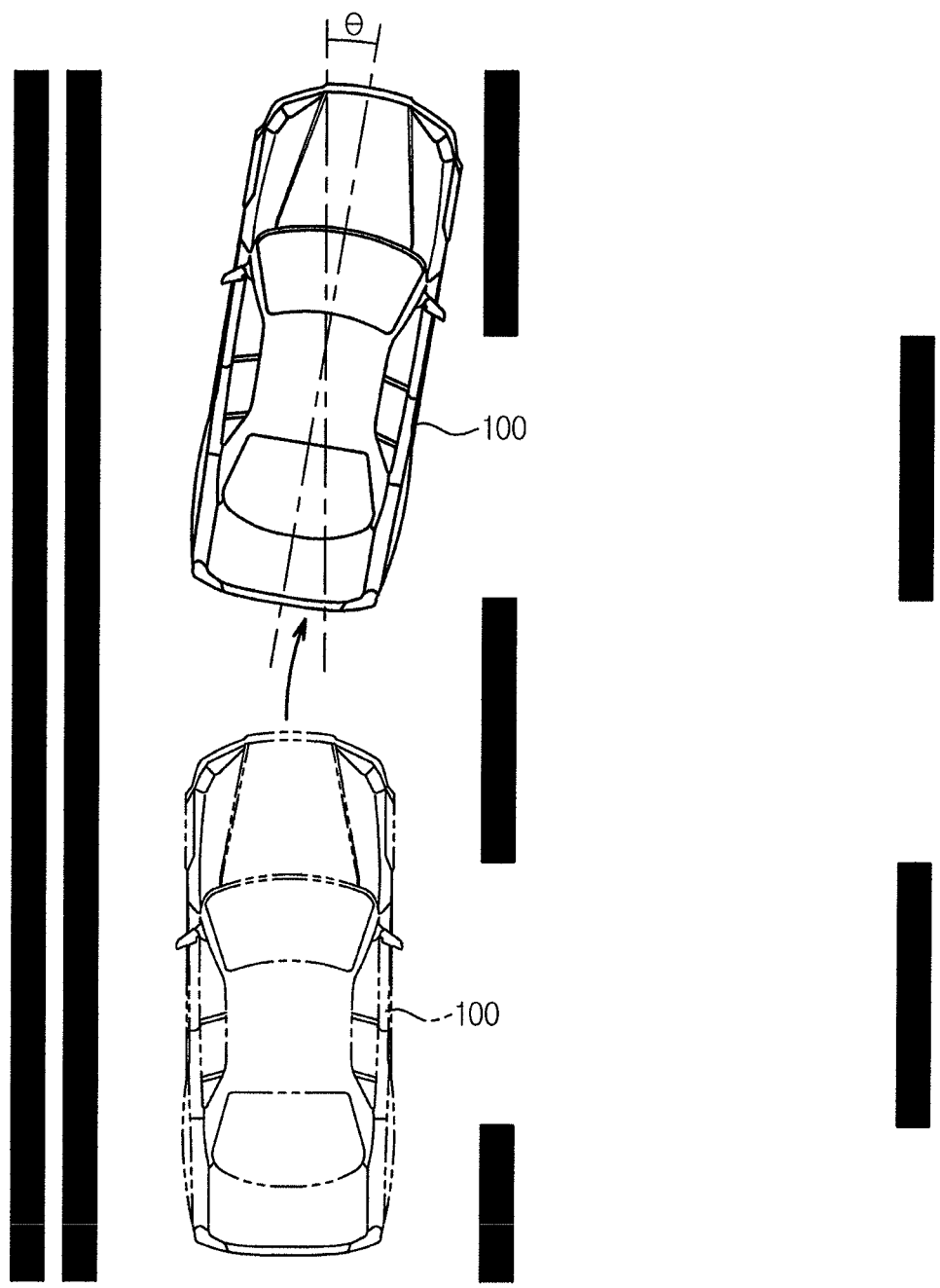
FIG. 7 illustrates an example in which a vehicle according to an exemplary embodiment of the present invention releases coasting on the basis of the releasing method shown in FIG. 6.

FIG. 6 illustrates another example of a method of releasing coasting of a vehicle according to an exemplary embodiment of the present invention, and FIG. 7 illustrates an example in which a vehicle according to an exemplary embodiment of the present invention releases coasting on the basis of the releasing method shown in FIG. 6.

Referring to FIG. 6 and FIG. 7, a method 1200 of releasing coasting of a vehicle will be described.

The vehicle 100 is driven in a neutral state of the transmission 125 (1210). In other words, the vehicle 100 may perform coasting.

Operation 1210 may be the same as operation 1110 shown in FIG. 5.

The vehicle 100 determines whether a steering angle is equal to or greater than a first reference angle during the coasting (1220). The first reference angle may indicate an angle at which the vehicle 100 is configured to perform a lane change.

The vehicle 100 may determine whether a lane change of a driver occurs during the coasting, and when a lane change is predicted to occur, terminate the costing and engage the engine 115 with the transmission 125. The control unit 160 may periodically detect a steering angle and/or a steering torque of the steering wheel while driving using the steering angle sensor 130, and control the steering device 135 according to the detected steering angle and/or steering torque.

In order to determine whether a lane change occurs, the control unit 160 may control the steering angle sensor 130 to detect the steering angle of the steering wheel and compare the steering angle detected by the steering angle sensor 130 with a first reference angle.

When the steering angle is less than the first reference angle (NO in operation 1220), the vehicle 100 continues coasting in a neutral state of the transmission 125. Since the lane change is not predicted to occur, the vehicle 100 may continue coasting in a neutral state of the transmission 125.

When the steering angle is equal to or greater than the first reference angle (YES in operation 1220), the vehicle 100 determines whether the time for which the steering angle is kept equal to or greater than the first reference angle is equal to or greater than a reference time (1230).

When the time for which the steering angle of the vehicle 100 is kept equal to or greater than the first reference angle continues, the vehicle 100 may be likely to perform a lane change. Accordingly, to determine whether a lane change occurs, the control unit 160 may determine whether the time for which the steering angle detected by the steering angle sensor 130 is kept equal to or greater than the first reference angle is greater than or equal to the reference time.

When the time for which the steering angle is kept equal to or greater than the first reference angle is less than the reference time (NO in operation 1230), the vehicle 100 continues coasting in a neutral state of the transmission 125. When the time for which the steering angle is kept equal to or greater than the first reference angle is less than the reference time, a lane change is not predicted to occur, so that the vehicle 100 may continue coasting in a neutral state of the transmission 125.

When the time for which the steering angle is kept equal to or greater than the first reference angle is equal to or greater than the reference time (YES in operation 1230), the vehicle 100 releases the neutral state of the transmission 125 (1240).

When the steering angle is equal to or greater than the first reference angle and the time for which the steering angle is kept equal to or greater than the first reference angle is greater than or equal to the reference time, a lane change is predicted to occur as shown in FIG. 7. Furthermore, once the vehicle 100 has performed a lane change, an acceleration of the vehicle 100 may be predicted to occur. For example, a driver, once having changed a lane, may pass a preceding vehicle.

Since an acceleration of the vehicle 100 is predicted to occur after a lane change is performed, to rapidly respond to an acceleration command of a driver, the control unit 160 may release a neutral state of the transmission 125 and shift the transmission 125 to a driving state.

As described above, when a lane change is predicted to occur during coasting of the vehicle 100, the vehicle 100 may shift the transmission 125 to a driving state to terminate the coasting. As a result, the vehicle 100 may rapidly respond to an acceleration command of a driver subsequent to a lane change.

Figure 8:
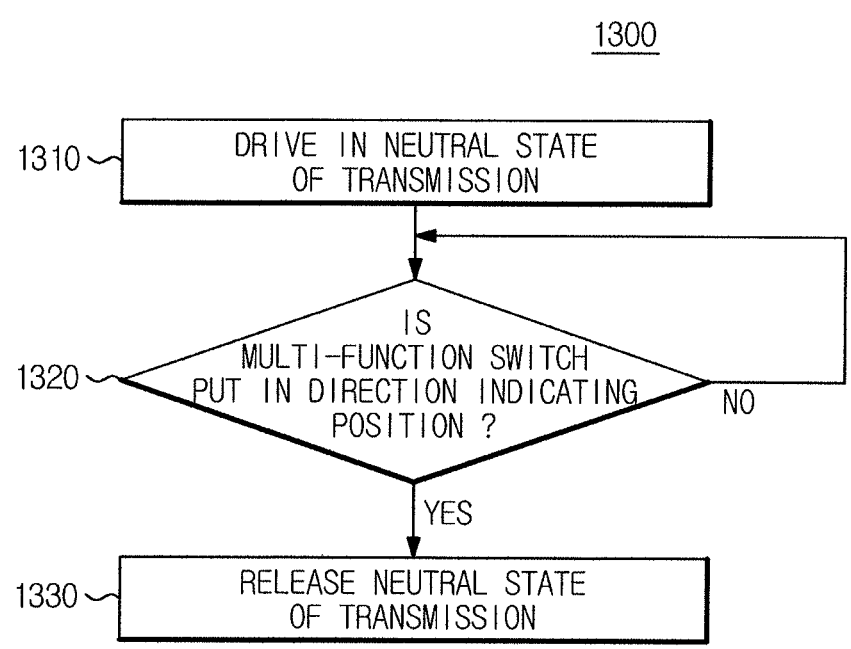
FIG. 8 illustrates another example of a method of releasing coasting of a vehicle according to an exemplary embodiment of the present invention.
Figure 9:
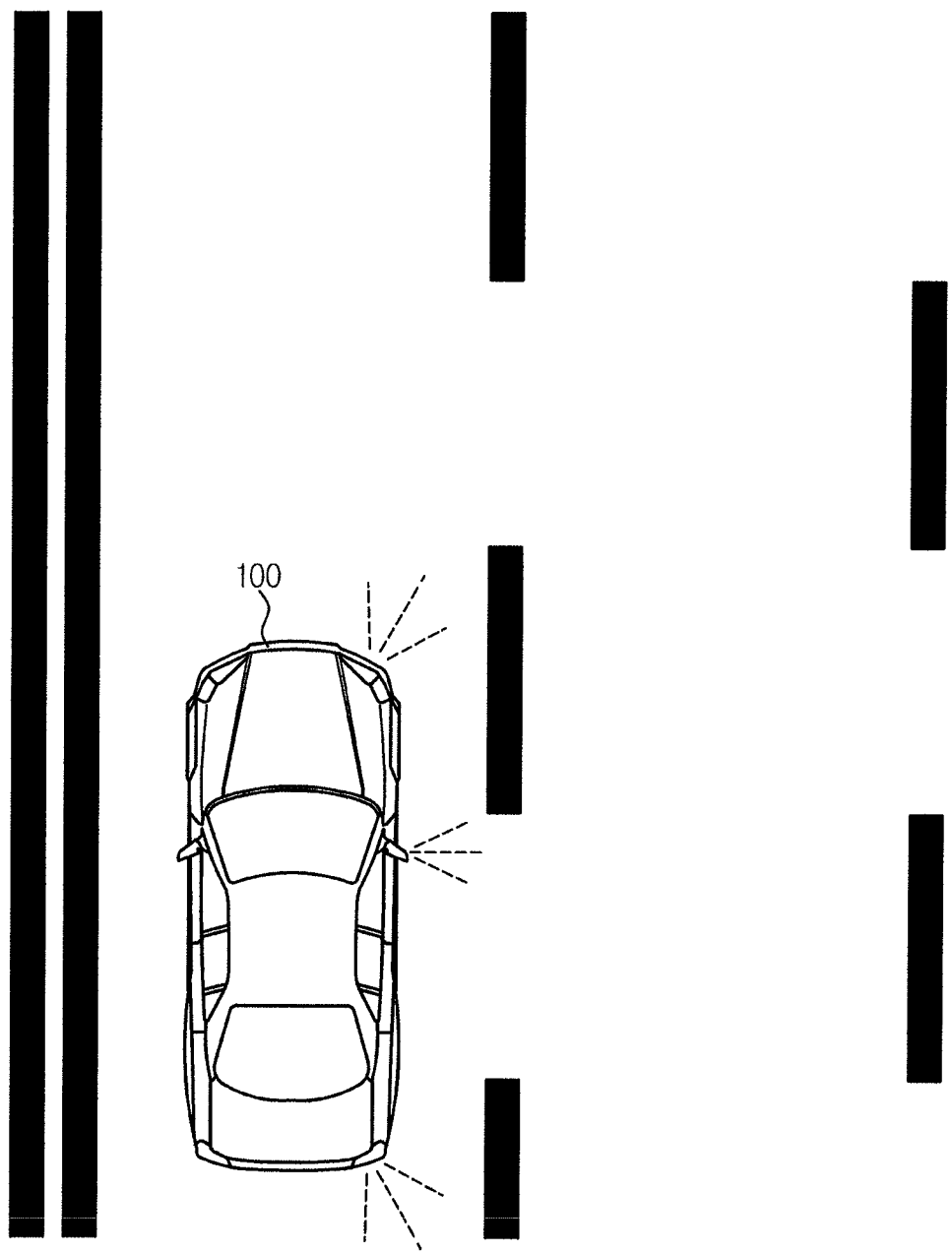
FIG. 9 illustrates an example in which a vehicle according to an exemplary embodiment of the present invention releases coasting on the basis of the releasing method shown in FIG. 8.

FIG. 8 illustrates another example of a method of releasing coasting of a vehicle according to an exemplary embodiment of the present invention. FIG. 9 illustrates an example in which a vehicle according to an exemplary embodiment of the present invention releases coasting on the basis of the releasing method shown in FIG. 8.

Referring to FIG. 8 and FIG. 9, a method 1300 of releasing coasting of the vehicle is described.

The vehicle 100 is driven in a neutral state of the transmission 125 (1310). In other words, the vehicle 100 may perform coasting.

Operation 1310 may be the same as operation 1110 shown in FIG. 5.

The vehicle 100, while performing coasting, determines whether the multi-function switch 150 is disposed in a direction-indicating position (1320).

The multi-function switch 150 may receive a turn-on command of the leftward indicating lamp or a turn-on command of the rightward indicating lamp, and may output the received turn-on command to the control unit 160. Furthermore, the multi-function switch 150 may be put in a leftward indicating position for turning on the leftward indicating lamp and may be put in a rightward indicating position for turning on the rightward indicating lamp.

Accordingly, when the multi-function switch 150 is disposed in a predetermined direction indicating position, the direction indicating lamp 155 is turned on, and the turn-on of the direction indicating lamp 155 may indicate a lane change intention of a driver.

To determine whether a driver has a lane change intention, the control device 160 may determine whether the multi-function switch 150 is disposed in the direction indicating position.

Furthermore, to determine whether a driver has a lane change intention, the control unit 160 may determine whether the direction indicating lamp 155 is turned on.

When the multi-function switch 150 is not put in the direction-indicating position (NO in operation 1320), the vehicle 100 continues coasting in a neutral state of the transmission 125. When the multi-function switch 150 is not put in the direction indicating position, it is not determined that a driver does not have a lane change intention, thus the vehicle 100 may continue coasting in a neutral state of the transmission 125.

When the multi-function switch 150 is disposed in the direction-indicating position (YES in operation 1320), the vehicle 100 releases the neutral state of the transmission 125 (1330).

When the multi-function switch 150 is disposed in the direction indicating position, the vehicle 100 turns on the direction indicating lamp as shown in FIG. 9, so that a lane change intention is included to another other vehicle. In other words, when the multi-function switch 150 is disposed in the direction indicating position, a lane change of the vehicle 100 may be predicted to occur. Furthermore, when the vehicle 100 has performed a lane change, an acceleration of the vehicle 100 may be predicted to occur. For example, a driver, having changed a lane, may pass a preceding vehicle. Since an acceleration of the vehicle 100 is predicted to occur after a lane change, the control unit 160 may release the neutral state of the transmission 125 and shift the transmission 125 to a driving state to rapidly respond to an acceleration command of a driver.

As described above, when a lane change is predicted to occur during coasting of the vehicle 100, the vehicle 100 may shift the transmission 125 to a driving state to terminate the coasting. As a result, the vehicle 100 may rapidly respond to an acceleration command of a driver subsequent to the lane change.

Figure 10:
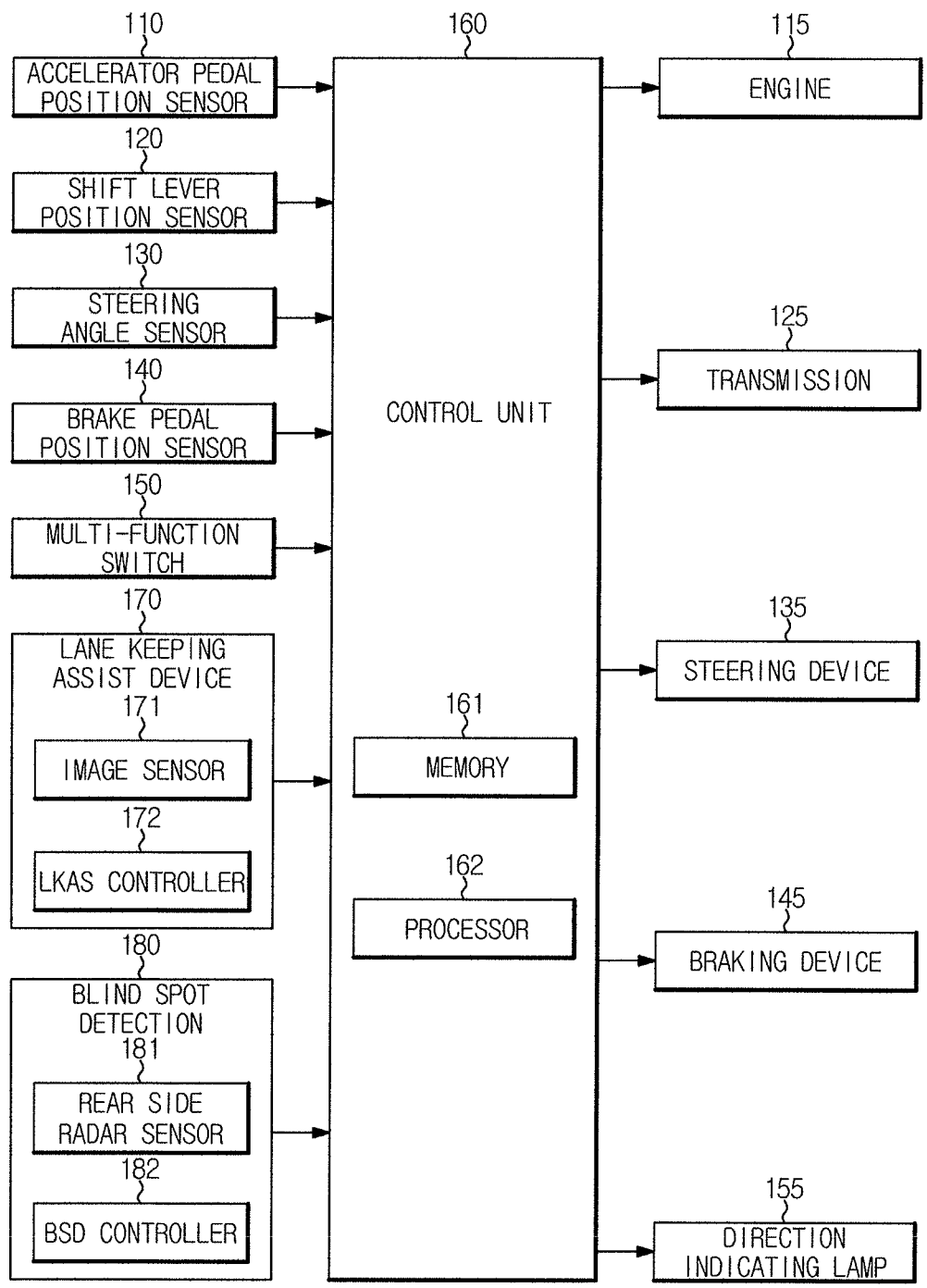
FIG. 10 illustrates another example of a configuration of a vehicle according to an exemplary embodiment of the present invention.

FIG. 10 illustrates another example of a configuration of a vehicle according to an exemplary embodiment of the present invention.

Referring to FIG. 10, the vehicle 100 may include an accelerator pedal position sensor 110, a shift lever position sensor 120, a steering angle sensor 130, a brake pedal position sensor 140, a multi-function switch 150, an engine 115, a transmission 125, a steering device 135, a braking device 145, a lane keeping assist device 170, a blind spot detection (BSD) 180, a direction indicating lamp 155, and a control unit 160.

The accelerator pedal position sensor 110, the shift lever position sensor 120, the steering angle sensor 130, the brake pedal position sensor 140, the multi-function switch 150, the engine 115, the transmission 125, the steering device 135, the braking device 145, the direction indicating lamp 155, and the control unit 160 may be the same as those shown in FIG. 3.

The lane-keeping assistant device 170 may include an image sensor 171 and a lane keeping assistant system (LKAS) controller 172. The image sensor 171 may capture a front view image of the vehicle 100 and transmit the front view image to the LKAS controller 172.

The LKAS controller 172 may receive the front view image of the vehicle 100 from the image sensor 171 and identify a lane departure of the vehicle 100 on the basis of the received image. The LKAS controller 172 may alert the driver to the lane departure audibly, tactually or visually in a response to detection of the lane departure of the vehicle 100 or may control the steering device 135 to assist in the lane keeping in a response to detection of the lane departure of the vehicle 100.

The BSD 180 may include a rear side radar sensor 181 and a BSD controller 182. The rear side radar sensor 181 emits detecting radio waves backwards of the vehicle 100, receives reflected radio waves reflected from an obstacle (another vehicle), and transmits data regarding the received reflective radio waves to the BSD controller 182.

The BSD controller 182 may detect an obstacle (another vehicle) behind the vehicle on the basis of the data regarding the reflective radio waves received from the rear side of the vehicle 100 by the rear side radar sensor 181. The BSD controller 182 may alert the driver to detection of an obstacle (another vehicle) behind the vehicle in an audible, tactile or visual manner in a response to detection of the obstacle (the other vehicle) behind the vehicle.

In comparison with the control unit 160 shown in FIG. 3, the control unit 160 may further control the transmission 125 on the basis of output signals of the lane keeping assistant device 170 and/or the BSD 180.

For example, when a lane departure is predicted to occur during coasting in a neutral state of the transmission 125, the control unit 160 may shift the transmission 125 to a driving state, and control rotation of the engine 115 according to an acceleration intention of a driver. In detail, when the vehicle 100 is predicted to depart from the lane, the control unit 160 may engage the engine 115 with the transmission 125 using the clutch, and adjust the fuel supplied to the engine 115 according to the position of the accelerator pedal detected by the accelerator pedal position sensor 110. As a result, the vehicle 100 may rapidly respond to an acceleration command of the driver.

On the other hand, when a lane change of the vehicle 100 is predicted to occur during the coasting in a neutral state of the transmission 125 and accordingly a centerline violation of the vehicle 100 is predicted to occur, the control unit 160 may continue coasting in a neutral state of the transmission

125. Since it is determined that a driver does not intend a lane change, the control unit 160 may maintain a neutral state of the transmission 125 until an acceleration intention and/or braking intention of a driver is detected. As a result, the fuel efficiency of the vehicle 100 may be improved.

Even when a lane change of the vehicle 100 is predicted to occur, the control unit 160 may continue coasting in a neutral state of the transmission 125 when another vehicle is detected on the rear side of the vehicle 100. When another vehicle is detected on a lane to which a lane change is desired by the driver, it is predicted that the driver maintains the current lane, and thus the control unit 160 maintains the neutral state of the transmission 125 until an acceleration intention and/or braking intention of the driver is detected. As a result, the fuel efficiency of the vehicle 100 may be improved.

As described above, to improve the fuel efficiency, the vehicle 100 may perform coasting, and to improve the acceleration response, the vehicle 100 may terminate coasting in a response to a lane change being predicted to occur. Furthermore, even when the lane change is predicted to occur, the vehicle 100 may continue coasting when the driver is not predicted to perform a lane change.

Figure 11:
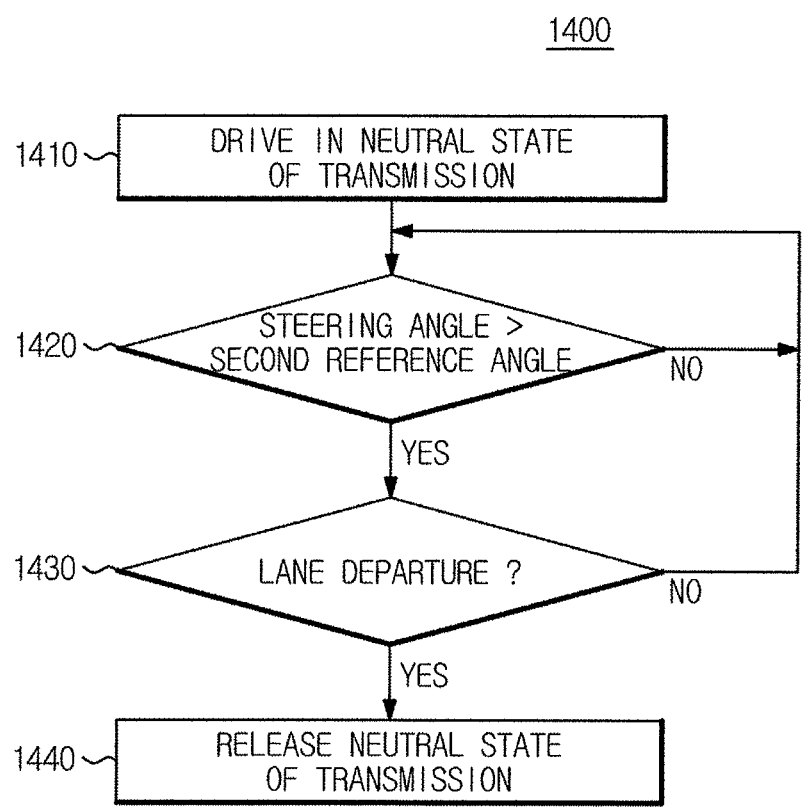
FIG. 11 illustrates an example of a method of releasing coasting of a vehicle according to an exemplary embodiment of the present invention.

FIG. 11 illustrates an example of a method of releasing coasting of a vehicle according to an exemplary embodiment of the present invention.

Referring to FIG. 11, a method 1400 for releasing coasting of the vehicle is described.

The vehicle 100 is driven in a neutral state of the transmission 125 (1410). In other words, the vehicle 100 may perform coasting.

Operation 1410 may be the same as operation 1210 shown in FIG. 6.

During the coasting, the vehicle 100 determines whether the steering angle is equal to or greater than a second reference angle (1420). The second reference angle may indicate an angle at which the vehicle 100 is configured to perform a lane change lane.

Operation 1420 may be the same as operation 1220 shown in FIG. 6.

When the steering angle is less than the second reference angle (NO in operation 1420), the vehicle 100 continues coasting in a neutral state of the transmission 125. Since a lane change is not predicted to occur, the vehicle 100 may continue coasting in a neutral state of the transmission 125.

When the steering angle is equal to or greater than the second reference angle (Yes in operation 1420), the vehicle 100 determines whether a lane departure occurs (1430).

When the steering angle of the vehicle 100 is equal to or greater than the second reference angle and a lane departure of the vehicle 100 is predicted to occur, it may be estimated that the driver desires to change the lane. Accordingly, to determine whether the driver has a lane-change intention, the control unit 160 may determine whether a lane departure occurs on the basis of an output signal of the lane-keeping assistant device 170.

The lane-keeping assistant device 170 may predict a lane departure of the vehicle 100 and may transmit a message regarding a lane departure of the vehicle 100 to the control unit 160 through the vehicle communication network NT. The control unit 160 may determine whether a lane departure of the vehicle 100 occurs on the basis of the message received from the lane-keeping assistant device 170.

When a lane departure of the vehicle 100 is not predicted to occur (NO in operation 1430), the vehicle 100 continues coasting in a neutral state of the transmission 125. Since a lane change is not predicted to occur, the vehicle 100 may continue coasting in a neutral state of the transmission 125.

When a lane departure of the vehicle 100 is predicted to occur (Yes in operation 1430), the vehicle 100 releases the neutral state of the transmission 125 (1440).

When the steering angle is equal to or greater than the second reference angle and a lane departure is predicted to occur, it is predicted that the vehicle 100 may perform a lane change. Furthermore, after the vehicle 100 changes the lane, an acceleration of the vehicle 100 may be predicted to occur subsequent to the lane change. For example, a driver, having changed a lane, may pass a preceding vehicle.

Since the acceleration of the vehicle 100 is predicted to occur subsequent to the lane change, the control unit 160 may release the neutral state of the transmission 125 and shift the transmission 125 to the driving state to rapidly respond to an acceleration command of the driver.

As described above, when a lane change is predicted to occur during coasting of the vehicle 100, the vehicle 100 may shift the transmission 125 to the driving state to terminate the coasting. As a result, the vehicle 100 may rapidly respond to an acceleration command of the driver subsequent to the lane change.

Figure 12:
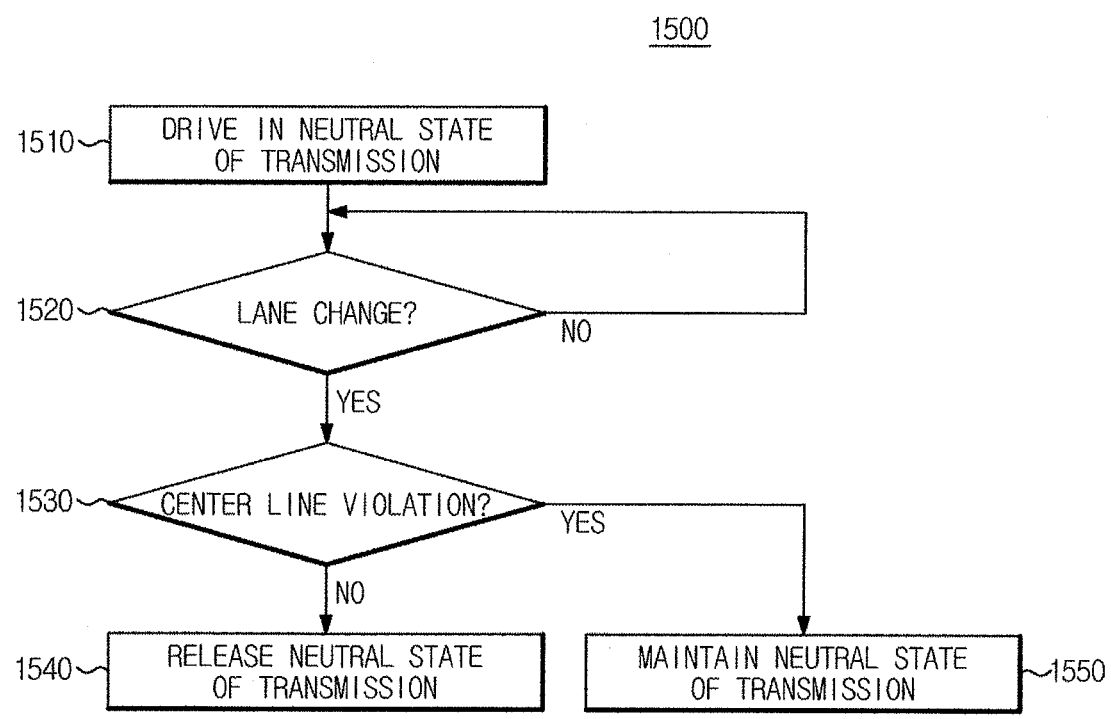
FIG. 12 illustrates another example of a method of releasing coasting of a vehicle according to an exemplary embodiment of the present invention.
Figure 13:
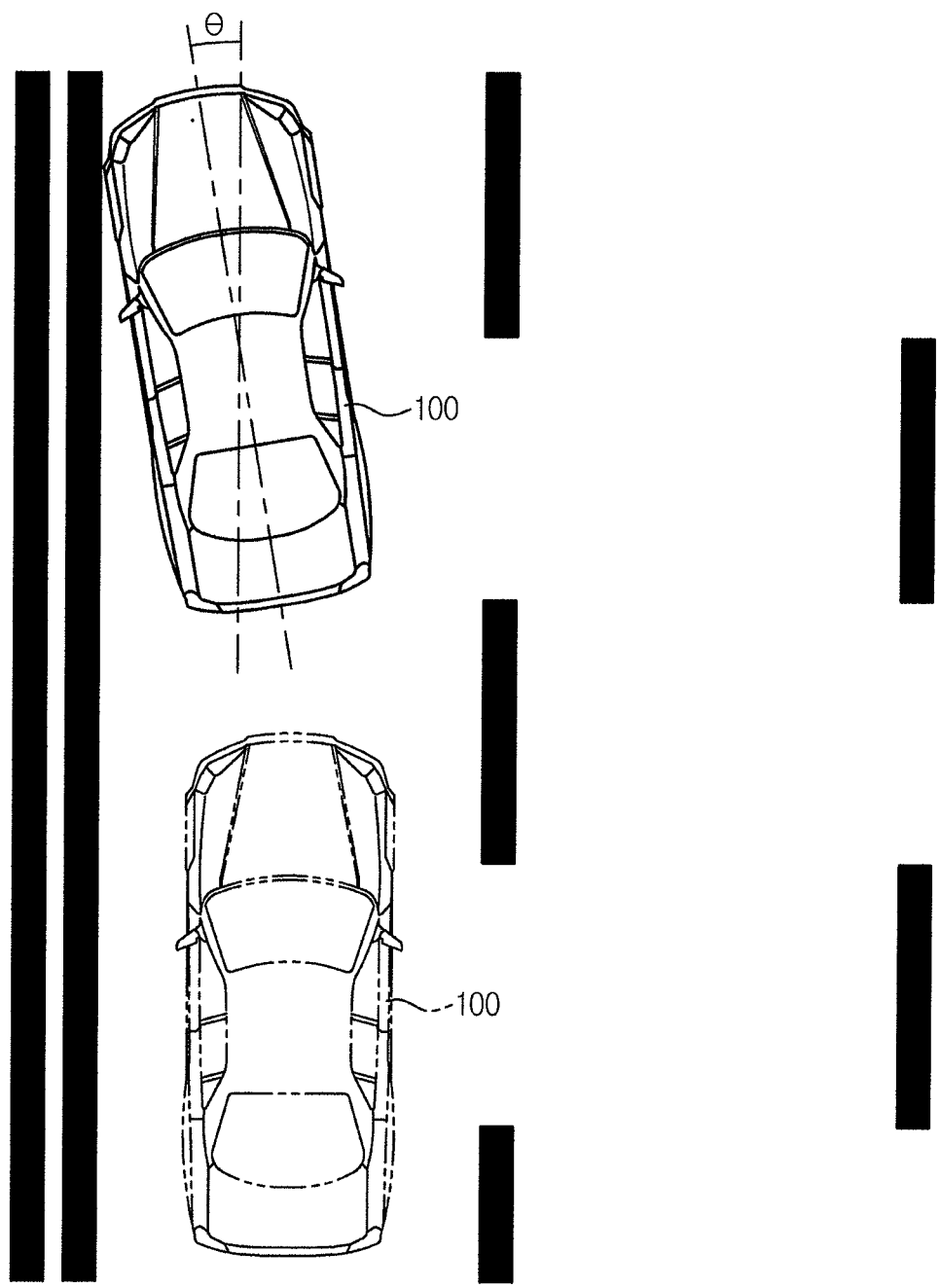
FIG. 13 illustrates an example in which a vehicle according to an exemplary embodiment maintains coasting on the basis of the releasing method shown in FIG. 12.

FIG. 12 illustrates another example of a method of releasing coasting of a vehicle according to an exemplary embodiment of the present invention. FIG. 13 illustrates an example in which a vehicle according to an exemplary embodiment maintains coasting on the basis of the releasing method shown in FIG. 12.

Referring to FIG. 12, and FIG. 13, a method 1500 of releasing coasting of the vehicle is described.

The vehicle 100 is driven in a neutral state of the transmission 125 (1510). In other words, the vehicle 100 may perform coasting.

Operation 1510 may be the same as operation 1110 shown in FIG. 5.

During the coasting, the vehicle 100 may determine whether a lane change occurs (1520).

The vehicle 100 may determine whether a lane change occurs in various ways.

For example, when the steering angle detected by the steering angle sensor 130 is equal to or greater than a first reference angle and the time for which the steering angle is kept equal to or greater than the first reference angle is greater than or equal to a reference time, the control unit 160 may determine that a lance change of the vehicle 100 occurs.

As an exemplary embodiment of the present invention, when the multi-function switch 150 is disposed in a direction-indicating position or the direction indicating lamp 155 is turned on, the control unit 160 may determine that a lane change of the vehicle 100 occurs.

As an exemplary embodiment of the present invention, the steering angle detected by the steering angle sensor 130 is equal to or greater than a second reference angle and occurrence of a lane departure is detected by the lane departure assistance device 170, the control unit 160 may determine that a lane change of the vehicle 100 occurs.

When a lane change of the vehicle 100 is determined to occur (NO in operation 1520), the vehicle 100 determines whether a center line violation is predicted to occur (1530).

The vehicle 100 may predict whether a center line violation of the vehicle 100 occurs by use of the lane keeping assistant device 170.

The lane-keeping assistant device 170 may determine the type of boundary lines at both sides of the lane on which the vehicle 100 is travelling. In detail, the lane-keeping assistant device 170 may determine whether the boundary lines at both sides of the lane on which the vehicle 100 is traveling include a center line.

When a centerline violation due to a lane change is not predicted to occur (NO in operation 1530), the vehicle 100 releases the neutral state of the transmission 125 (1540).

When a lane change is determined to occur and a center line violation due to the lane change is not predicted to occur, the control unit 160 may release the neutral state of the transmission 125 and shift the transmission 125 to a driving state to rapidly respond to an acceleration command of the driver subsequent to the lane change.

When a center line violation due to the lane change is predicted to occur (YES in operation 1530), the vehicle 100 maintains the neutral state of the transmission 125 (1550).

Referring to FIG. 13, when a center line violation of the vehicle 100 is predicted to occur, the lane-keeping assistant device 170 may transmit a message regarding the center line violation of the vehicle 100 to the control unit 160 through the vehicle communication network NT. The control unit 160 may determine whether a center line violation of the vehicle 100 occurs on the basis of the message received from the lane-keeping assistant device 170.

Even when a lane change of the vehicle 100 is predicted to occur, it may be determined that the driver does not intend to change the lane in a case when a center line violation due to the lane change is predicted to occur. Furthermore, it may be predicted that the driver continues the coasting afterwards.

Accordingly, the control unit 160 may maintain the neutral state of the transmission 125 to improve the fuel efficiency of the vehicle 100.

As described above, even when the lane change is predicted during coasting of the vehicle 100, the vehicle 100 may maintain the neutral state of the transmission 125 in a case when the center line violation of the vehicle 100 is predicted to occur. As a result, the fuel efficiency of the vehicle 100 may be improved.

Figure 14:
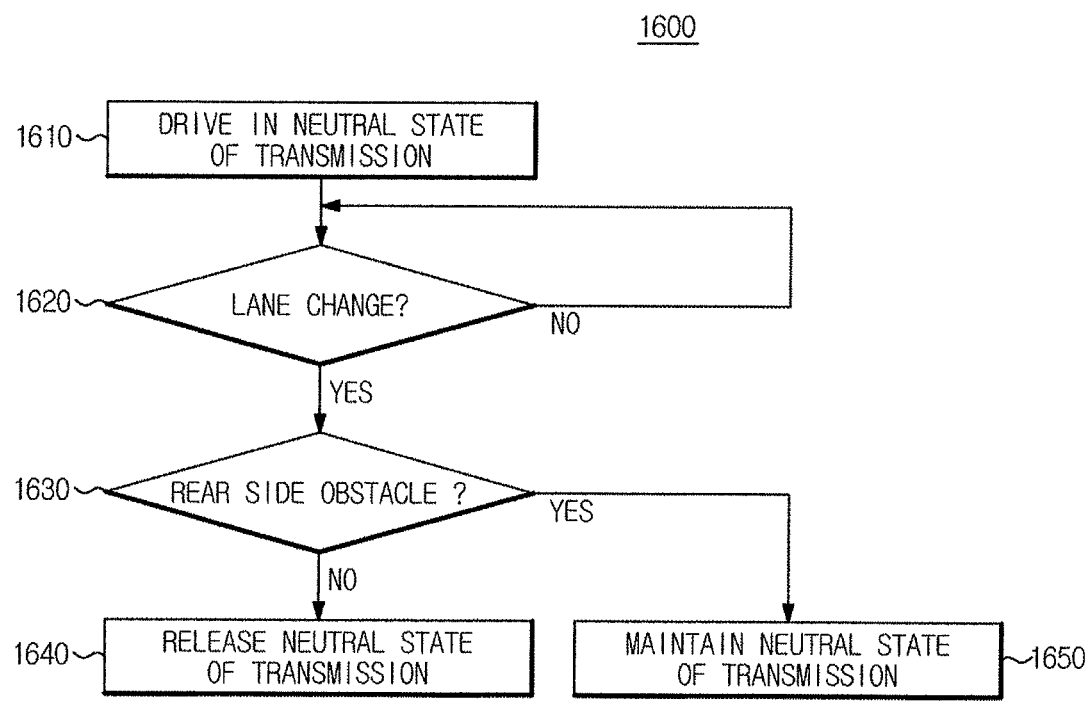
FIG. 14 illustrates another example of a method of releasing coasting of a vehicle according to an exemplary embodiment of the present invention.
Figure 15:
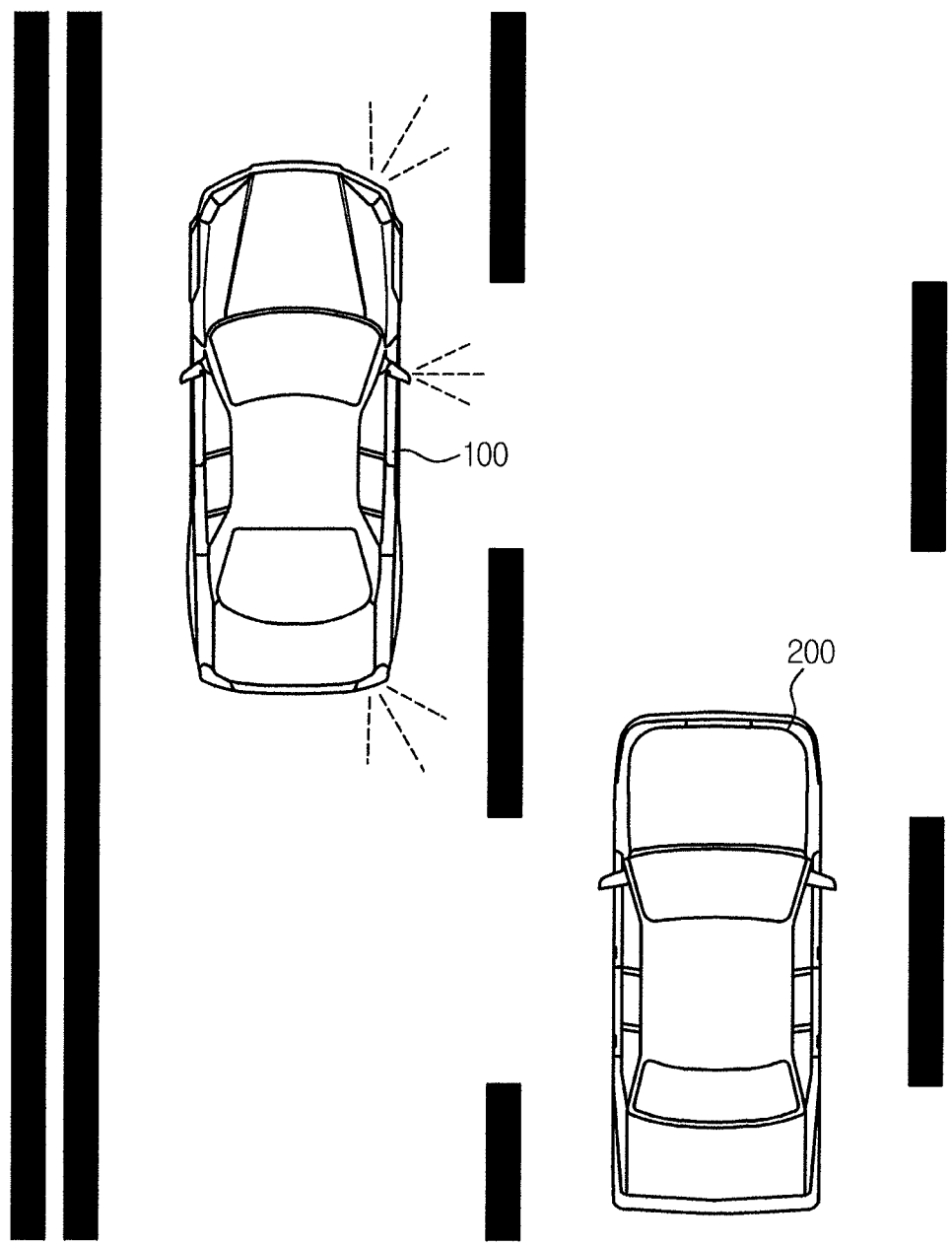
FIG. 15 illustrates an example in which a vehicle according to an exemplary embodiment maintains coasting on the basis of the releasing method shown in FIG. 14.

FIG. 14 illustrates another example of a method of releasing coasting of a vehicle according to an exemplary embodiment of the present invention. FIG. 15 illustrates an example in which a vehicle according to an exemplary embodiment maintains coasting on the basis of the releasing method shown in FIG. 14.

Referring to FIG. 14, and FIG. 15, a method 1600 of releasing coasting of the vehicle is described.

The vehicle 100 is driven in a neutral state of the transmission 125 (1610). In other words, the vehicle 100 may perform coasting.

Operation 1610 may be the same as operation 1510 shown in FIG. 12.

During the coasting, the vehicle 100 may determine whether a lane change occurs (1620). The vehicle 100 may determine whether a lane change occurs in various ways.

Operation 1620 may be the same as operation 1520 shown in FIG. 12.

When a lane change of the vehicle 100 is determined to occur (NO in operation 1620), the vehicle 100 determines the presence or absence of an obstacle 200 (another vehicle) behind the vehicle 100 (1630).

The vehicle 100 may determine whether an obstacle 200 (another vehicle) is located behind the vehicle 100 using the BSD 180.

The BSD 180 may detect an obstacle 200 (another vehicle) behind the vehicle 100, and may transmit a message regarding the obstacle 200 (the other vehicle) behind the vehicle 100 to the control unit 160 through the vehicle communication network NT. The control unit 160 may determine the presence or absence of the obstacle 200 (the other vehicle) behind the vehicle 100 on the basis of the message received from the BSD 180.

When no obstacle 200 (another vehicle) behind the vehicle 100 is detected (NO in operation 1630), the vehicle 100 releases the neutral state of the transmission 125 (1640).

When a lane change of the vehicle 100 is determined to occur and there is no other vehicle behind the vehicle 100, the control unit 160 releases the neutral state of the transmission 125 and shifts the transmission 125 to a driving state to rapidly respond to an acceleration command of the driver subsequent to the lane change.

When an obstacle 200 (another vehicle) behind the vehicle 100 is detected (YES in operation 1630), the vehicle 100 maintains the neutral state of the transmission 125 (1650).

Referring to FIG. 15, when an obstacle 200 (another vehicle) behind the vehicle 100 is detected, the BSD 180 transmits a message regarding the obstacle 200 (the other vehicle) behind the vehicle 100 to the control unit 160 through the vehicle communication network NT. The control unit 160 may determine the presence or absence of the obstacle 200 (the other vehicle) behind the vehicle 100 on the basis of the message received from the BSD 180.

Even when a lane change of the vehicle 100 is predicted to occur, it may be determined that the driver does not intend to change the lane in a case when another vehicle exists behind the vehicle 100. It may be further predicted that the driver continues coasting afterwards.

Accordingly, the control unit 160 may maintain the neutral state of the transmission 125 to improve the fuel efficiency of the vehicle 100.

As described above, the vehicle 100 may maintain the neutral state of the transmission 125 when another vehicle is detected behind the vehicle 100 even when a lane change is predicted to occur during coasting of the vehicle. As a result, the fuel efficiency of the vehicle 100 may be improved.

Figure 16:
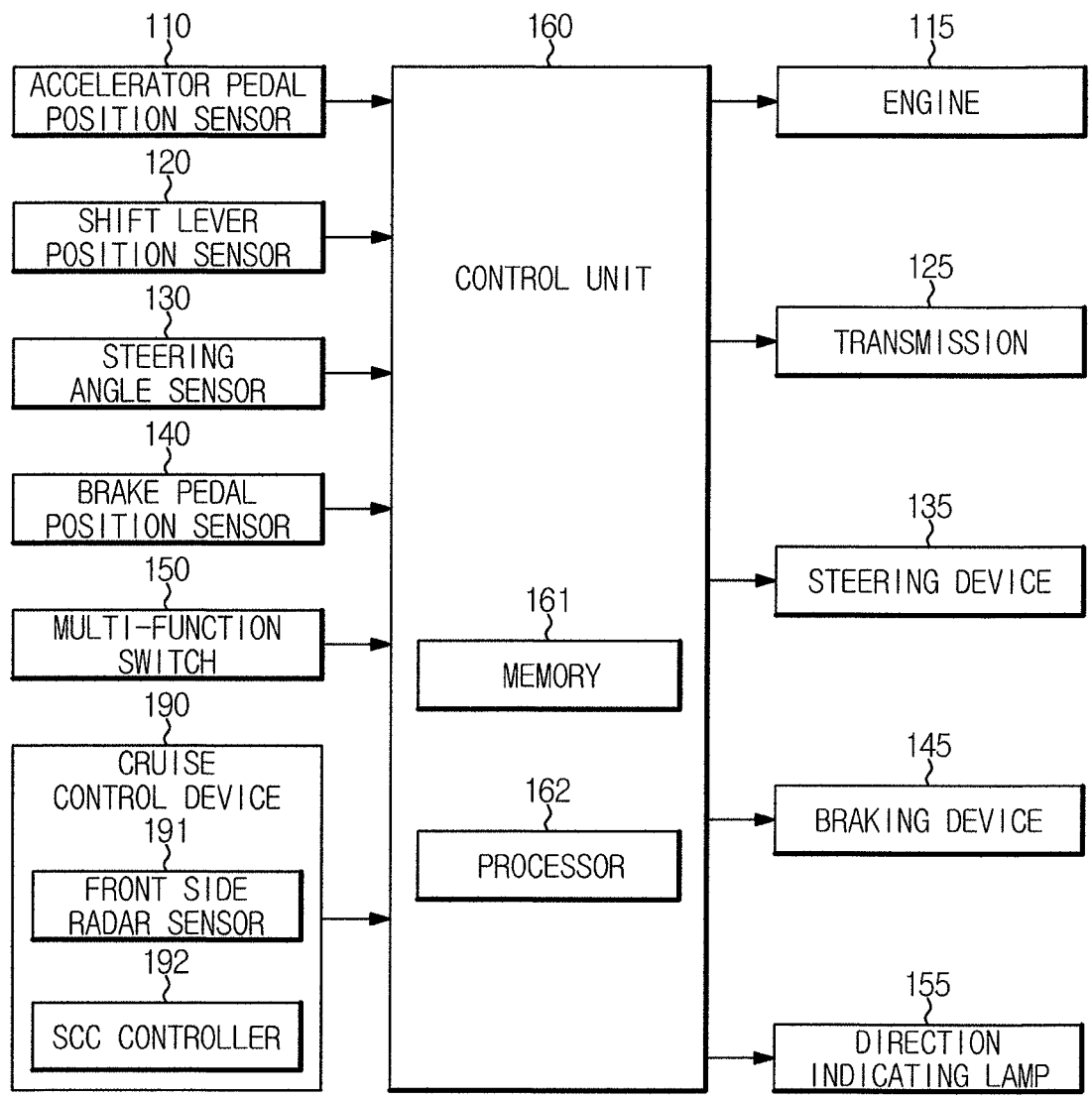
FIG. 16 illustrates another example of a configuration of a vehicle according to an exemplary embodiment of the present invention.

FIG. 16 illustrates another example of a configuration of a vehicle according to an exemplary embodiment of the present invention.

Referring to FIG. 16, the vehicle 100 may include an accelerator pedal position sensor 110, a shift lever position sensor 120, a steering angle sensor 130, a brake pedal position sensor 140, a multi-function switch 150, an engine 115, a transmission 125, a steering device 135, a braking device 145, a cruise control device 190, a direction indicating lamp 155, and a control unit 160.

The accelerator pedal position sensor 110, the shift lever position sensor 120, the steering angle sensor 130, the brake pedal position sensor 140, the multi-function switch 150, the engine 115, the transmission 125, the steering device 135, the braking device 145, the direction indicating lamp 155, and the control unit 160 may be the same as those shown in FIG. 3.

The cruise control device 190 may include a front side radar sensor 191 and a smart cruise control (SCC) controller 192. The front side radar sensor 191 may emit sending radio waves forwards of the vehicle 100 and receive reflective radio wave reflected from an obstacle (another vehicle) and transmit data regarding the received reflective radio waves to the SCC controller 192.

The SCC controller 192 may detect a front side obstacle (another vehicle) in front of the vehicle 100 on the basis of the data regarding the reflective radio waves received from the front of the vehicle 100 by the front side radar sensor 191. The SCC controller 192 may determine the distance to the front side obstacle (the other vehicle), a direction toward the front side obstacle (the other vehicle), and a relative speed of the front side obstacle (the other vehicle), that is, a difference between the speed of the vehicle and the other vehicle. The SCC controller 192 may control the acceleration and/or deceleration of the vehicle 100 on the basis of the distance to the front side obstacle (the other vehicle) and the relative speed of the front side (the other vehicle).

In comparison with the control unit 160 shown in FIG. 3, the control unit 160 may further control the transmission 125 on the basis of an output signal of the cruise control device 190.

For example, when an approach of a preceding vehicle is detected during the coasting in a neutral state of the transmission 125, there is a high possibility that the vehicle 100 is decelerated or accelerated by the driver. Accordingly, the control unit 160 may shift the transmission 125 to a driving state, and control rotation of the engine 115 according to an acceleration intention of the driver. In detail, when the distance to the preceding vehicle is less than a first reference distance, the control unit 160 may engage the engine 115 with the transmission 125 using the clutch, and adjust the fuel supplied to the engine 115 according to the position of the accelerator pedal detected by the accelerator pedal position sensor 110. As a result, the vehicle 100 may rapidly respond to an acceleration/deceleration command of the driver.

Furthermore, when an acceleration or deceleration of the preceding vehicle is detected during coasting in a neutral state of the transmission 125, there is a high possibility that the vehicle 100 is decelerated or accelerated by the driver. Accordingly, the control unit 160 may shift the transmission 125 to a driving state and control rotation of the engine 115 according to an acceleration intention of the driver. In detail, when the relative speed of the preceding vehicle is greater than a first reference speed or less than a second reference speed, the control unit 160 may engage the engine 115 with the transmission 125 using the clutch and adjust the fuel supplied to the engine 115 according to the position of the accelerator pedal detected by the accelerator pedal position sensor 110. As a result, the vehicle 100 may rapidly respond to an acceleration/deceleration command.

As described above, to improve the fuel efficiency, the vehicle 100 may perform the coasting, and to improve the acceleration response, the vehicle 100 may terminate coasting in a response to approach of the preceding vehicle or acceleration/deceleration of the preceding vehicle.

Figure 17:
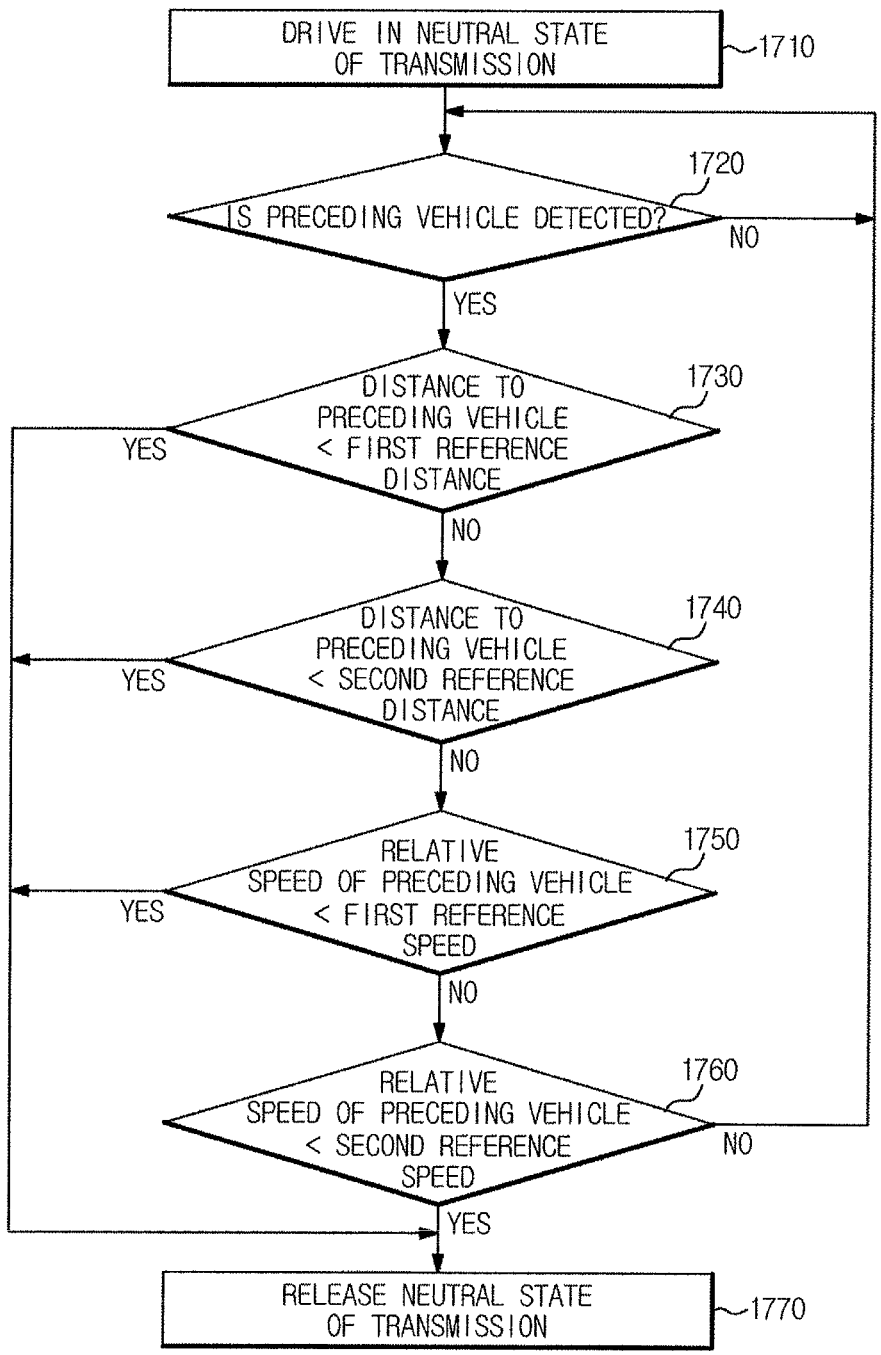
FIG. 17 illustrates an example of a method of releasing coasting of a vehicle according to an exemplary embodiment of the present invention.

FIG. 17 illustrates an example of a method of releasing coasting of a vehicle according to an exemplary embodiment of the present invention. FIG. 18, FIG. 19, FIG. 20 and FIG. 21 illustrate an example in which a vehicle according to an exemplary embodiment of the present invention releases coasting on the basis of the releasing method shown in FIG. 17.

Referring to FIGS. 17, 18, 19, 20, and 21, a method 1700 of releasing coasting of a vehicle is described.

The vehicle 100 is driven in a neutral state of the transmission 125 (1710). In other words, the vehicle 100 may perform coasting.

Operation 1710 may be the same as operation 1210 shown in FIG. 6.

During the coasting, the vehicle 100 may determine whether a preceding vehicle 300 is detected (1720).

The vehicle 100 may determine the presence or absence of another vehicle located in front of the vehicle 100, that is, a preceding vehicle 300, using the cruise control device 190.

The cruise control device 190 may transmit detecting radio waves forwards of the vehicle 100 and receive reflective radio wave reflected from the preceding vehicle 300. The cruise control device 190 may detect the preceding vehicle 300 of the vehicle 100 on the basis of the received reflective radio waves, and may transmit a message regarding the presence or absence of the preceding vehicle 300 of the vehicle 100 to the control unit 160 through the vehicle communication network NT. The control unit 160 may determine the presence or absence of the preceding vehicle 300 of the vehicle 100 on the basis of the message received from the cruise control device 190.

When the preceding vehicle 300 of the vehicle 100 is not detected (NO in operation 1720), the vehicle 100 continues coasting in a neutral state of the transmission 125. Since the preceding vehicle 300 is not detected, an acceleration/deceleration command of a driver due to existence of the preceding vehicle 300 is not expected to be input. Accordingly, the vehicle 100 may continue coasting in a neutral state of the transmission 125.

When the preceding vehicle 300 of the vehicle 100 is detected (YES in operation 1720), the vehicle 100 determines whether a distance D to the preceding vehicle 300 is less than a first reference distance (1730).

The vehicle 100 may determine the distance D to a vehicle in front of the vehicle 100, that is, the preceding vehicle 300, using the cruise control device 190.

The cruise control device 190 may emits sending radio waves forwards of the vehicle 100 and receive reflective radio wave reflected from the preceding vehicle 300. The cruise control device 190 may determine the distance D to the preceding vehicle 300 on the basis of the received reflective radio waves, and may transmit a message regarding the distance D to the preceding vehicle 300 to the control unit 160 through the vehicle communication network NT. The control unit 160 may determine the distance D to the preceding vehicle 300 of the vehicle 100 on the basis of the message received from the cruise control device 190.

Furthermore, the control unit 160 may compare the distance D to the preceding vehicle 300 of the vehicle 100 with a first reference distance.

When the distance D to the preceding vehicle 300 is less than the first reference distance (YES in operation 1730), the vehicle 100 releases the neutral state of the transmission 125 (1770).

Figure 18:
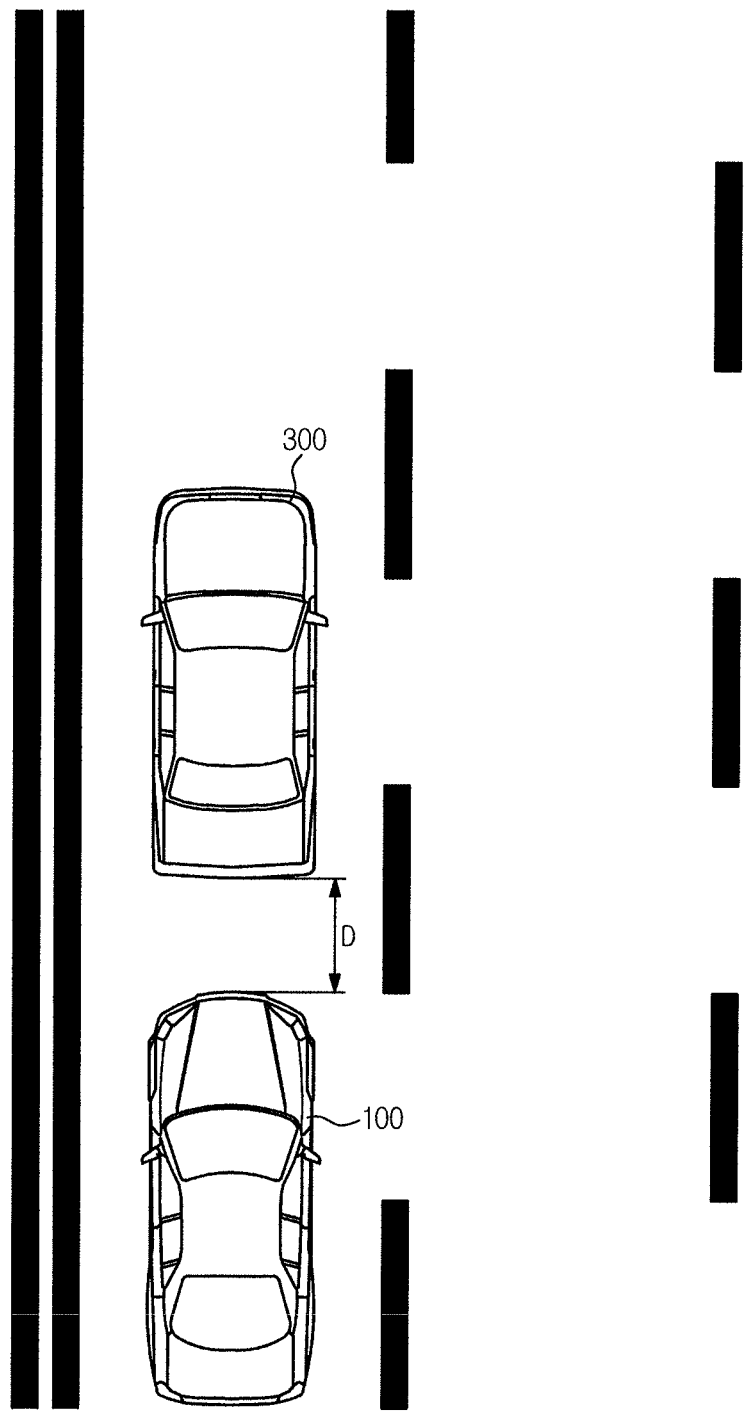
FIG. 18, FIG. 19, FIG. 20 and FIG. 21 illustrate an example in which a vehicle according to an exemplary embodiment of the present invention releases coasting on the basis of the releasing method shown in FIG. 17.

Referring to FIG. 18, the driver may decelerate the vehicle 100 when the preceding vehicle 300 exists and the distance D to the preceding vehicle 300 is less than the first reference distance. Since deceleration or acceleration of the vehicle 100 by the driver is predicted to occur as such, the control unit 160 may release the neutral state of the transmission 125 and shifts the transmission 125 to the driving state to rapidly respond to an acceleration command of the driver.

When the distance D to the preceding vehicle 300 is not less than the first reference distance (NO in operation 1730), the vehicle 100 determines whether the distance D to the preceding vehicle 300 is greater than a second reference distance (1740).

The vehicle 100 may determine the distance D to the other vehicle in front of the vehicle 100, that is, the preceding vehicle 300, using the cruise control device 190.

In operation 1740, the control unit 160 may determine the distance D to the preceding vehicle 300 of the vehicle 100 in a similar manner as operation 1730.

Furthermore, the control unit 160 may compare the distance D to the preceding vehicle 300 of the vehicle 100 with the second reference distance. The second reference distance may be a distance greater than the first reference distance.

When the distance D to the preceding vehicle 300 is greater than the second reference distance (YES in 1740), the vehicle 100 releases the neutral state of the transmission 125 (1770).

Figure 19:
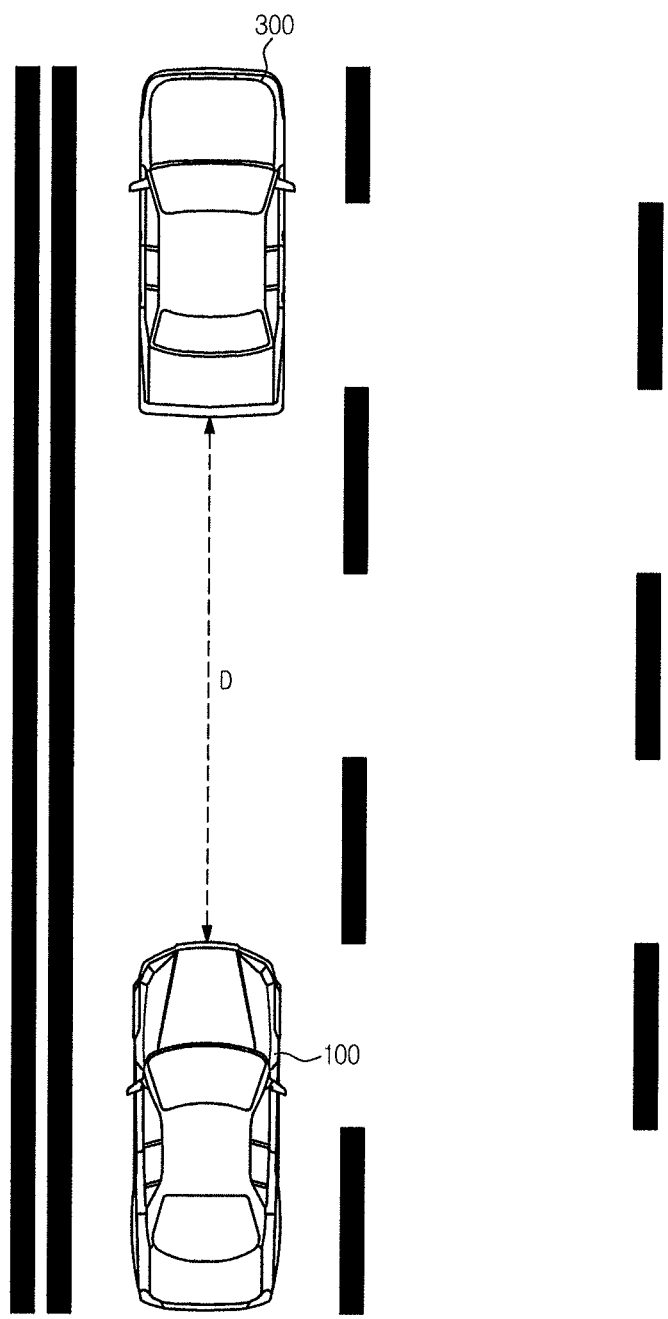

Referring to FIG. 19, the driver may accelerate the vehicle 100 when the preceding vehicle 300 exists and the distance D to the preceding vehicle 300 is greater than the second reference distance. Since deceleration or acceleration of the vehicle 100 by the driver is predicted as such, the control unit 160 may release the neutral state of the transmission 125 and shifts the transmission 125 to a driving state to rapidly respond to an acceleration command of the driver.

When the distance D to the preceding vehicle 300 is greater than the first reference distance and less than the second reference distance (when the distance D to the preceding vehicle 300 falls within a range between the first reference distance and the second reference distance) (NO in operation 1740), the vehicle 100 determines whether the relative speed of the preceding vehicle 300 is less than a first reference speed (1750).

The vehicle 100 may determine the relative speed of the preceding vehicle 300 of the vehicle 100 using the cruise control device 190. Here, the relative speed may represent a difference V300-V100 between a speed V100 of the vehicle 100 and a speed V300 of the preceding vehicle 300.

The cruise control device 190 may emit detecting radio waves forwards of the vehicle 100 and receive reflective radio waves reflected from the preceding vehicle 300. The cruise control device 190 may determine the relative speed V300-V100 of the preceding vehicle 300 on the basis of the received reflective waves and may transmit a message regarding the relative speed V300-V100 of the preceding vehicle 300 of the vehicle 100 to the control unit 160 through the vehicle communication network NT. The control unit 160 may determine the relative speed V300-V100 of the preceding vehicle 300 of the vehicle 100 on the basis of the message received from the cruise control device 190.

Furthermore, the control unit 160 may compare the relative speed V300-V100 of the preceding vehicle 300 of the vehicle 100 with a first reference speed.

When the relative speed V300-V100 of the preceding vehicle 300 is less than the first reference speed (YES in operation 1750), the vehicle 100 releases the neutral state of the transmission 125 (1770).

Figure 20:
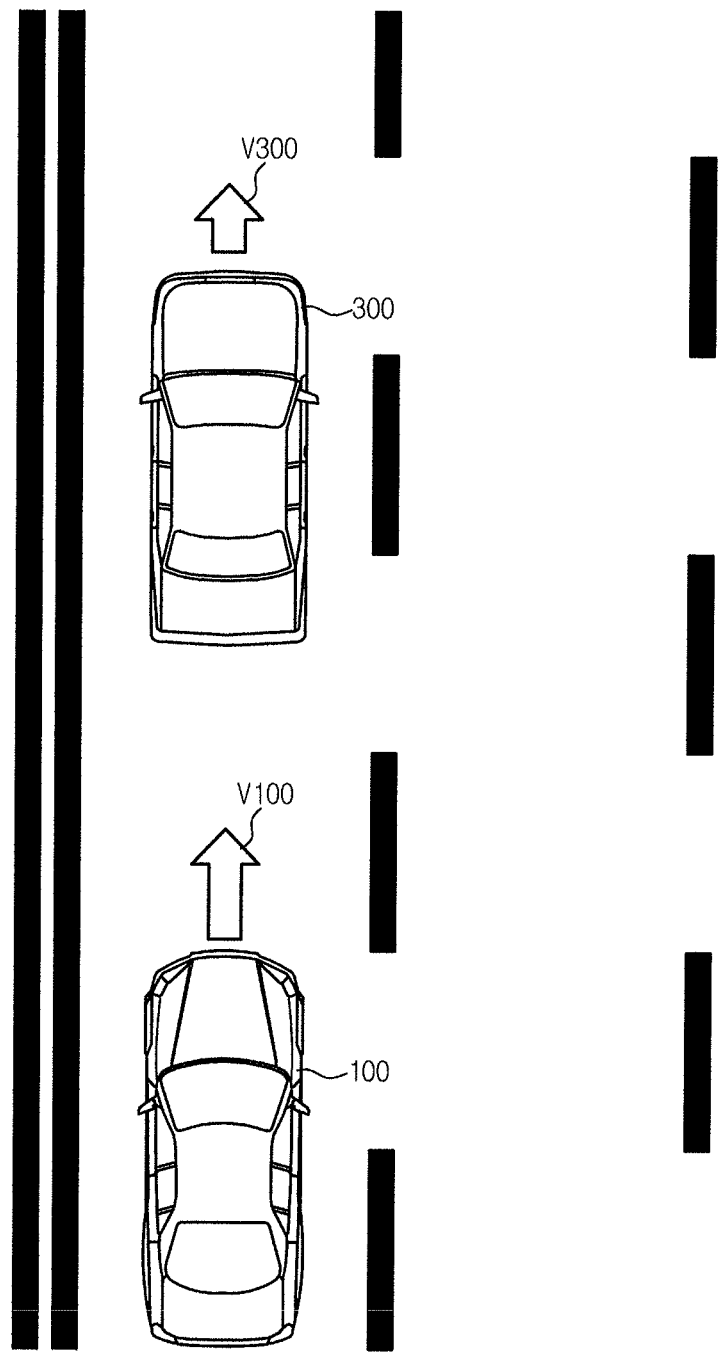

Referring to FIG. 20, when the preceding vehicle 300 exists in a range between the first reference distance and the second reference distance, and the preceding vehicle 300 decelerates, the driver may decelerate the vehicle 100. Since the deceleration or acceleration of the vehicle 100 by the driver is predicted as such, the control unit 160 may release the neutral state of the transmission 125 and shift the transmission 125 to the driving state to rapidly respond to an acceleration command of the driver.

When the relative speed V300-V100 of the preceding vehicle 300 is not less than the first reference speed (NO in operation 1750), the vehicle 100 determines whether the relative speed V300-V100 is greater than the second reference speed (1760).

The vehicle 100 may determine the relative speed V300-V100 of the preceding vehicle 300 of the vehicle 100 using the cruise control device 190.

In operation 1760, the control unit 160 may determine the relative speed V300-V100 of the preceding vehicle 300 of the vehicle 100 in a similar manner as operation 1750.

Furthermore, the control unit 160 may compare the relative speed V300-V100 of the preceding vehicle 300 of the vehicle 100 with the second reference speed. Here, the second reference speed may be higher than the first reference speed.

When the relative speed V300-V100 of the preceding vehicle 300 is greater than the second reference speed (YES in operation 1760), the vehicle 100 releases the neutral state of the transmission 125 (1770).

Figure 21:
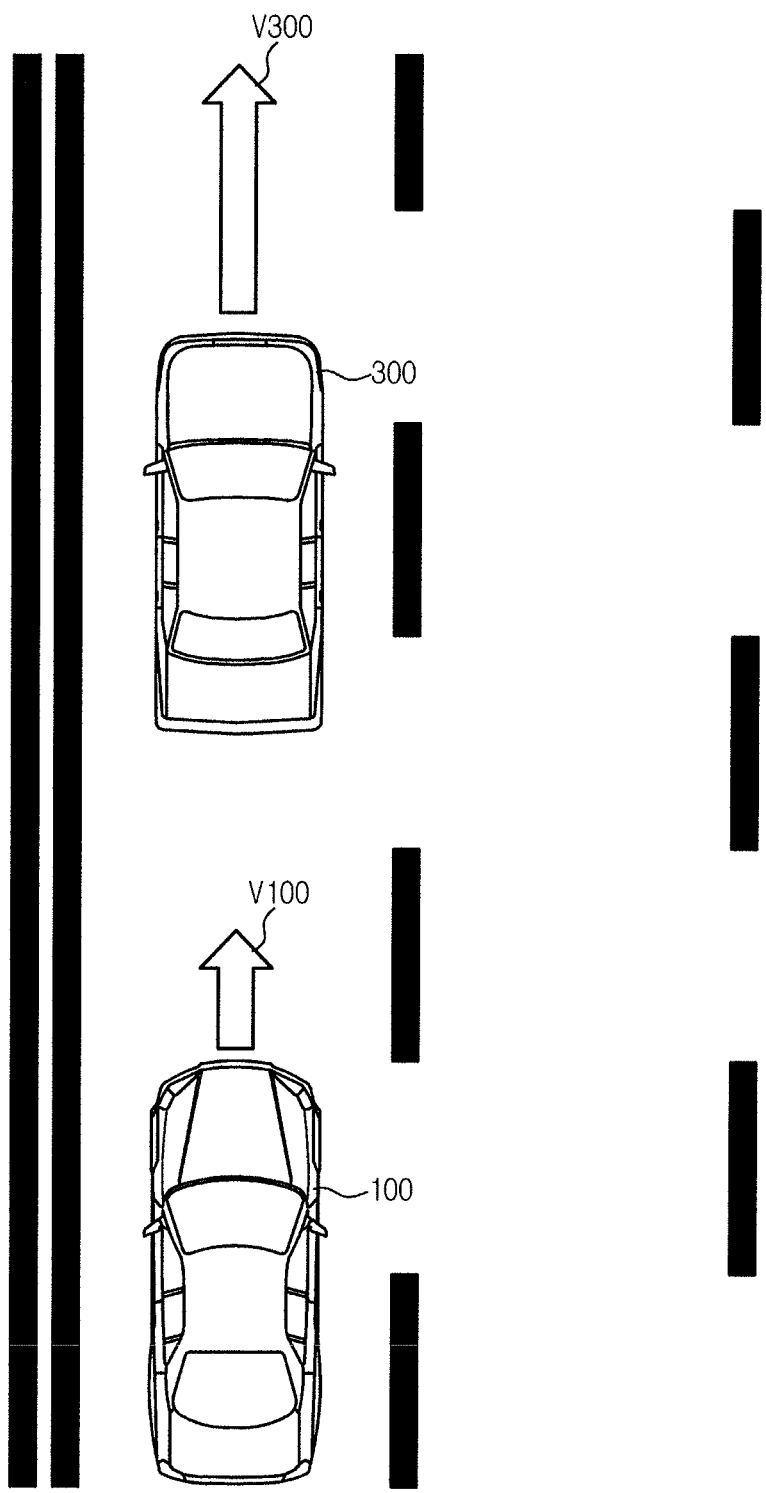

Referring to FIG. 21, when the preceding vehicle 300 exists in a range between the first reference distance and the second reference distance and the preceding vehicle 300 accelerates, the driver may accelerate the vehicle 100. Since deceleration or acceleration of the vehicle 100 by the driver is predicted as such, the control unit 160 may release the neutral state of the transmission 125 and shift the transmission 125 to the driving state to rapidly respond to an acceleration command of the driver.

When the relative speed V300-V100 of the preceding vehicle 300 is greater than the first reference speed and less than the second reference speed (when the distance D to the preceding vehicle 300 is in a range between t the first reference distance and the second reference distance, and the relative speed V300-V100 of the preceding vehicle 300 is in a range between the first reference speed and the second reference speed) (NO in operation 1760), the vehicle 100 continues coasting in a neutral state of the transmission 125. Since the preceding vehicle 300 does not move toward or away from the vehicle 100, an acceleration/deceleration command due to existence of the preceding vehicle 300 is not expected to be input by the driver. Accordingly, the vehicle 100 may continue coasting in a neutral state of the transmission 125.

As described above, when acceleration/deceleration of the vehicle 100 is predicted according to the driving status of the preceding vehicle 300 during the coasting of the vehicle 100, the vehicle 100 may shift the transmission 125 to a driving state to terminate the coasting. As a result, the vehicle 100 may rapidly respond to an acceleration command of the driver subsequent to a lane change As is apparent from the above, the vehicle and method of controlling the same may shift a transmission to a neutral position during coasting.

The vehicle and method of controlling the same may shift a transmission to a driving position in a response to detecting an acceleration intention of a driver during coasting.

The vehicle and method of controlling the same may shift a transmission to a driving position in a response to detecting a lane change intention of a driver during coasting.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodi-

What is claimed is:

1. A vehicle comprising:
an engine;
a transmission;
an accelerator pedal position sensor;
a steering wheel;
a steering angle sensor; and
a processor configured to control the engine according to a position of an accelerator pedal detected by the accelerator pedal position sensor, and shift the transmission to a neutral state when the position of the accelerator pedal coincides with a reference position while the transmission is in a driving state,
wherein the processor is configured to shift the transmission to the driving state when a steering angle of the steering wheel detected by the steering angle sensor is equal to or greater than a reference angle while the transmission is in the neutral state.

2. The vehicle of claim 1, further including a multi-function switch,
wherein the processor is configured to shift the transmission to the driving state when the multi-function switch is disposed in a direction-indicating position while the transmission is in the neutral state.

3. The vehicle of claim 1, further including an image sensor configured to capture an image of a front side of the vehicle,
wherein the processor is configured to shift the transmission to the driving state when the steering angle of the steering wheel is equal to or greater than the reference angle and when a lane departure of the vehicle is detected on a basis of the image captured by the image sensor while the transmission is in the neutral state.

4. The vehicle of claim 1, further including an image sensor configured to capture an image of a front side of the vehicle,
wherein the processor is configured to maintain the transmission in the neutral state when a violation of a centerline of the vehicle is detected on a basis of the image captured by the image sensor while the transmission is in the neutral state.

5. The vehicle of claim 1, further including a rear side radar sensor configured to emit radio waves rearwards of the vehicle,
wherein the processor is configured to maintain the transmission in the neutral state when an obstacle disposed at a rear side of the vehicle is detected on a basis of reflective radio waves received by the rear side radar sensor while the transmission is in the neutral state.

6. The vehicle of claim 1, further including a front side radar sensor configured to emit radio waves forwards of the vehicle,
wherein the processor is configured to shift the transmission to the driving state when another vehicle disposed in a range of a first reference distance of the vehicle is detected on a basis of reflective radio waves received by the front side radar sensor with the transmission being in the neutral state.

7. The vehicle of claim 6, wherein the processor is configured to shift the transmission to the driving state when another vehicle disposed outside a range of a second reference distance of the vehicle, which is greater than the first reference distance, is detected on a basis of the reflective radio waves received by the front side radar sensor with the transmission being in the neutral state.

8. The vehicle of claim 7, wherein the processor is configured to shift the transmission to the driving state when another vehicle is detected to have a relative speed less than a first reference speed on a basis of the reflective radio waves received by the front side radar sensor while the transmission is in the neutral state.

9. The vehicle of claim 8, wherein the processor is configured to shift the transmission to the driving state when another vehicle is detected to have a relative speed greater than a second reference speed, which is greater than the first reference speed, on a basis of the reflective radio waves received by the front side radar sensor while the transmission is in the neutral state.

10. A method of controlling a vehicle including an engine, a transmission, a steering wheel, and a processor, the method comprising:
controlling, by the processor, the engine according to a position of an accelerator pedal;
shifting, by the processor, the transmission to a neutral state when a position of the accelerator pedal coincides with a reference position while the transmission is in a driving state; and
shifting, by the processor, the transmission to the driving state when a steering angle of the steering wheel is equal to or greater than a reference angle while the transmission is in the neutral state.

11. The method of claim 10, further including:
shifting, by the processor, the transmission to the driving state when a multi-function switch is disposed in a direction-indicating position while the transmission is in the neutral state.

12. The method of claim 10, further including:
shifting, by the processor, the transmission to the driving state when a lane departure of the vehicle is detected on a basis of a front view image captured by an image sensor while the transmission is in the neutral state.

13. The method of claim 10, further including:
maintaining, by the processor, the transmission in the neutral state when a violation of a centerline of the vehicle is detected on a basis of a front view image captured by an image sensor while the transmission is in the neutral state.

14. The method of claim 10, further including:
maintaining, by the processor, the transmission in the neutral state when an obstacle disposed at a rear side of the vehicle is detected on a basis of reflective radio waves received by a rear side radar sensor while the transmission is in the neutral state.

15. The method of claim 10, further including:
shifting, by the processor, the transmission to the driving state when another vehicle disposed in a range of a first reference distance of the vehicle is detected on a basis of reflective radio waves received by a front side radar sensor while the transmission is in the neutral state.

16. The method of claim 15, further including:
shifting, by the processor, the transmission to the driving state when another vehicle disposed outside a range of a second reference distance of the vehicle, which is greater than the first reference distance, is detected on a basis of the reflective radio waves received by the front side radar sensor while the transmission is in the neutral state.

17. The method of claim 16, further including:
shifting, by the processor, the transmission to the driving state when another vehicle is detected to have a relative speed less than a first reference speed on a basis of the reflective radio waves received by the front side radar sensor while the transmission is in the neutral state.

18. The method of claim 17, further including:
shifting, by the processor, the transmission to the driving state when another vehicle is detected to have a relative speed greater than a second reference speed, which is greater than the first reference speed, on a basis of the reflective radio waves received by the front side radar sensor while the transmission is in the neutral state.

19. A vehicle comprising:
an engine;
a transmission;
an accelerator pedal position sensor;
a multi-function switch;
a direction indicating lamp; and
a processor configured to control the engine according to a position of an accelerator pedal detected by the accelerator pedal position sensor, and shift the transmission to a neutral state when a position of the accelerator pedal coincides with a reference position while the transmission is in a driving state,
wherein the processor is configured to operate the direction-indicating lamp when the multi-function switch is disposed in a direction-indicating position, and to shift the transmission to the driving state when the multi-function switch is disposed in the direction-indicating position while the transmission is in the neutral state.

20. The vehicle of claim 19,
wherein the vehicle further includes a steering wheel and a steering angle sensor, and
wherein the processor is configured to shift the transmission to the driving state when a steering angle of the steering wheel detected by the steering angle sensor is equal to or greater than a reference angle while the transmission is in the neutral state.

* * * * *